(12) United States Patent
Hawkins et al.

(10) Patent No.: US 11,043,051 B2
(45) Date of Patent: Jun. 22, 2021

(54) METHOD, SYSTEM AND SOFTWARE PRODUCT FOR PROVIDING TEMPORARY ACCESS TO AN AREA CONTROLLED BY NETWORK-CONNECTED ENDPOINT DEVICES

(71) Applicant: Automatic Technology (Australia) Pty Ltd, Keysborough (AU)

(72) Inventors: Raymond Hawkins, Keysborough (AU); Geoffrey Baker, Keysborough (AU); Simon Ray Kelly, Keysborough (AU); Zachary Colin Duthie, Keysborough (AU)

(73) Assignee: Automatic Technology (Australia) Pty Ltd

( * ) Notice: Subject to any disclaimer, the term of this patent is extended or adjusted under 35 U.S.C. 154(b) by 0 days.

(21) Appl. No.: 16/468,765

(22) PCT Filed: Dec. 22, 2017

(86) PCT No.: PCT/AU2017/051462
§ 371 (c)(1),
(2) Date: Jun. 12, 2019

(87) PCT Pub. No.: WO2018/112559
PCT Pub. Date: Jun. 28, 2018

(65) Prior Publication Data
US 2020/0098215 A1     Mar. 26, 2020

(30) Foreign Application Priority Data

Dec. 22, 2016   (AU) .................................. 2016905335

(51) Int. Cl.
*G07C 9/00* (2020.01)
*H04L 29/06* (2006.01)
(Continued)

(52) U.S. Cl.
CPC ..... *G07C 9/00571* (2013.01); *G07C 9/00896* (2013.01); *H04L 9/32* (2013.01);
(Continued)

(58) Field of Classification Search
CPC ............ G07C 9/00571; G07C 9/00896; G07C 2009/00928; G07C 2009/0092;
(Continued)

(56) References Cited

U.S. PATENT DOCUMENTS

| 5,872,513 A | 2/1999 | Fitzgibbon et al. |
| 9,128,471 B1 | 9/2015 | Shahid et al. |

(Continued)

FOREIGN PATENT DOCUMENTS

WO   2016058044   4/2016

OTHER PUBLICATIONS

Hawkins, Raymond; International Preliminary Report on Patentability for PCT/AU2017/051462, filed Dec. 22, 2017, dated Apr. 18, 2019, 15 pgs.
(Continued)

*Primary Examiner* — Edwin C Holloway, III
(74) *Attorney, Agent, or Firm* — Taylor English Duma LLP

(57) ABSTRACT

The present invention concerns method for enabling provision of temporary access to an area controlled by a network-connected endpoint device, the method including the steps of: enrolling an access partner in an account for the endpoint device maintained at an access server; receiving from the access partner at the access server, requests for temporary access to the endpoint device; and activating the requests with the endpoint device such that the access partner is provided with temporary access to the area.

13 Claims, 19 Drawing Sheets

(51) Int. Cl.
  *H04L 9/32* (2006.01)
  *H04W 12/06* (2021.01)
  *H04W 76/11* (2018.01)
  *H04W 4/80* (2018.01)
  *H04W 12/069* (2021.01)

(52) U.S. Cl.
  CPC ........ *H04L 63/0853* (2013.01); *H04L 63/108* (2013.01); *H04W 4/80* (2018.02); *H04W 12/069* (2021.01); *H04W 76/11* (2018.02); *G07C 2009/00928* (2013.01)

(58) Field of Classification Search
  CPC ....... H04W 4/80; H04W 76/11; H04W 12/06; H04W 12/069; H04W 4/02; H04L 9/32; H04L 63/0853; H04L 63/108; G06Q 10/083
  USPC ........................................................ 340/5.71
  See application file for complete search history.

(56) References Cited

U.S. PATENT DOCUMENTS

| | | | | |
|---|---|---|---|---|
| 2002/0180582 | A1* | 12/2002 | Nielsen | G07C 9/00571 340/5.6 |
| 2006/0072755 | A1* | 4/2006 | Oskari | G07C 9/00309 380/270 |
| 2007/0247277 | A1* | 10/2007 | Murchison | G07C 9/27 340/5.2 |
| 2011/0035604 | A1* | 2/2011 | Habraken | G06F 21/34 713/193 |
| 2011/0084799 | A1 | 4/2011 | Ficko | |
| 2011/0311052 | A1* | 12/2011 | Myers | H04W 12/08 380/270 |
| 2012/0280783 | A1* | 11/2012 | Gerhardt | G07C 9/00309 340/5.6 |
| 2014/0266573 | A1* | 9/2014 | Sullivan | G07C 9/00571 340/4.32 |
| 2014/0365781 | A1* | 12/2014 | Dmitrienko | G06F 21/34 713/185 |
| 2015/0235173 | A1 | 8/2015 | Hall | |
| 2016/0196706 | A1* | 7/2016 | Tehranchi | H04W 4/80 340/5.61 |

OTHER PUBLICATIONS

Hawkins, Raymond; International Search Report and Written Opinion for PCT/AU20171051462, filed Dec. 22, 2017, dated Feb. 19, 2018, 11 pgs.

Automatic Techonology (Australia) Pty Ltd.; Extended European Search Report for application No. 17883212.7, dated Jun. 17, 2020, 10 pgs.

* cited by examiner

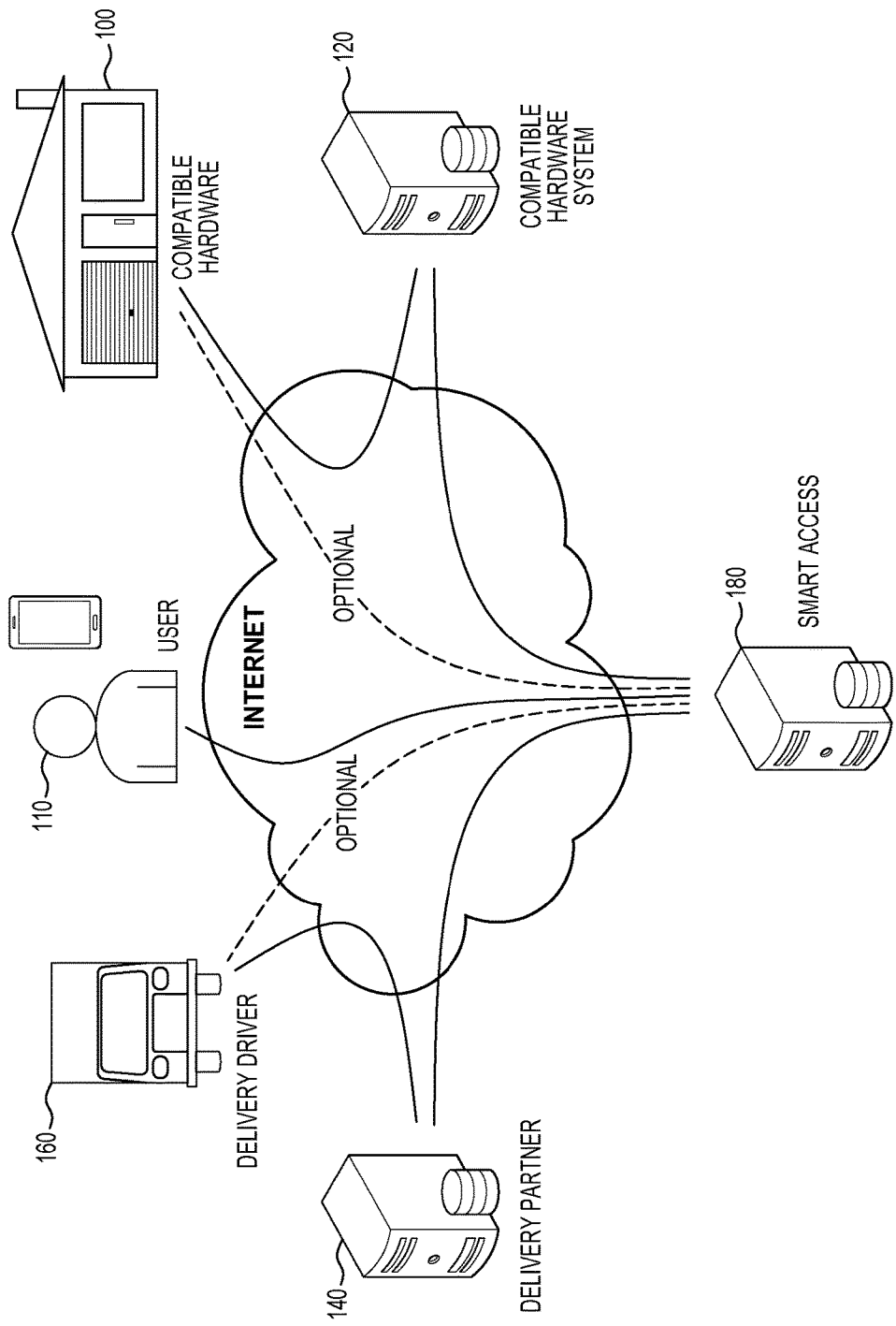

DELIVERY OVERVIEW

DELIVERY OVERVIEW

PARTNER API AUTHENTICATION

STATUS REQUEST

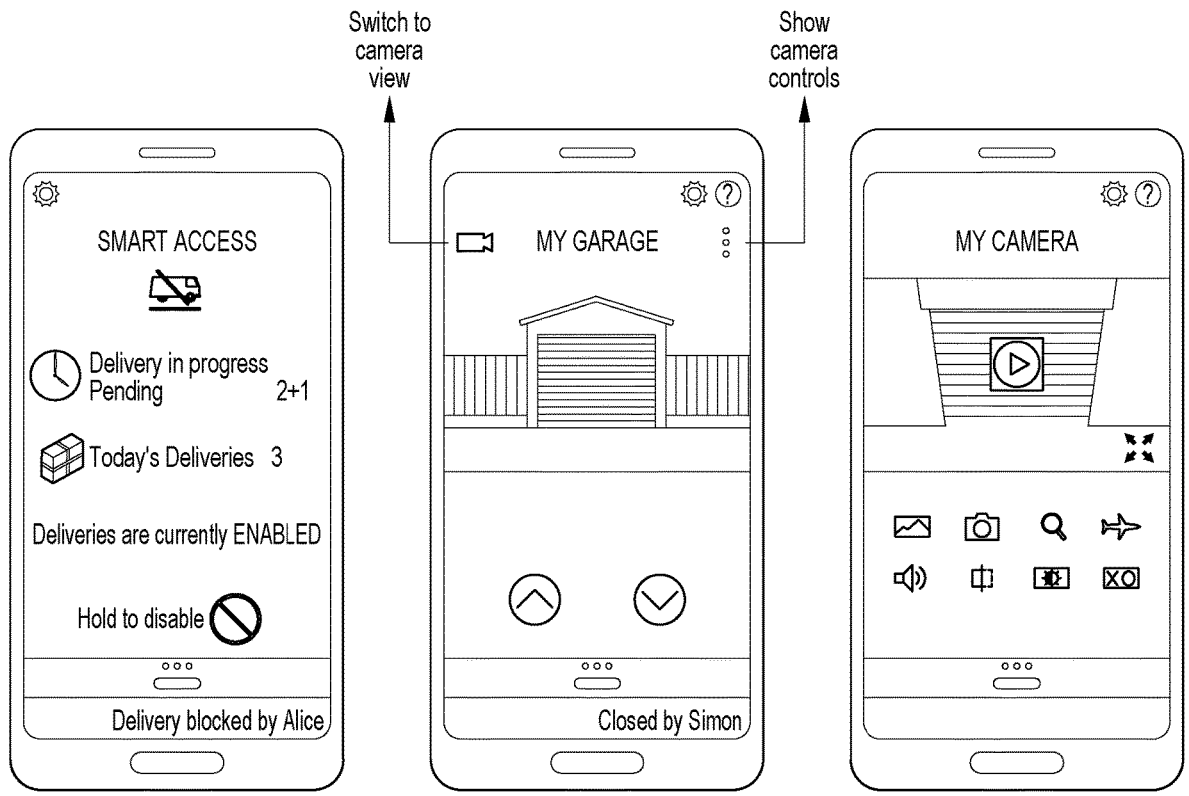
*Figure 12A*  *Figure 12B*  *Figure 12C*

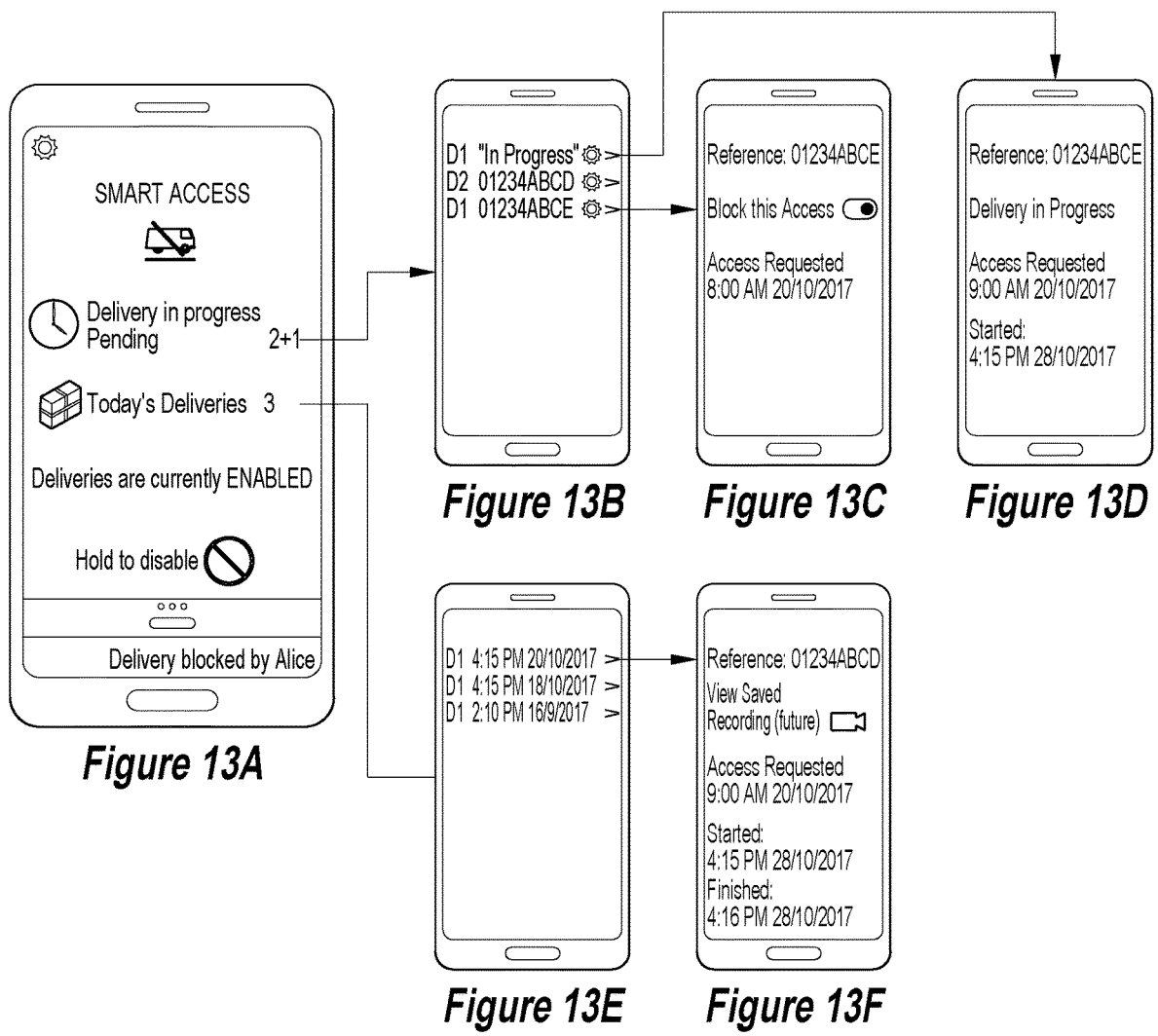

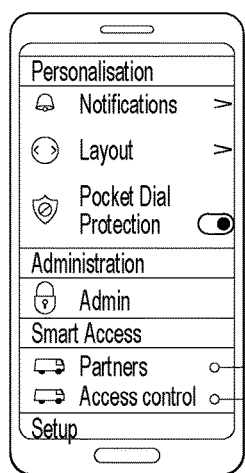
Figure 14A
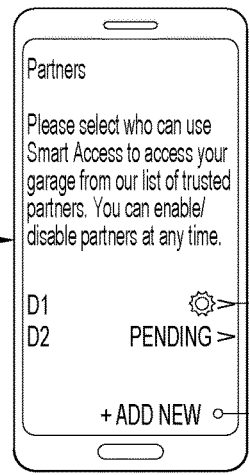
Figure 14B
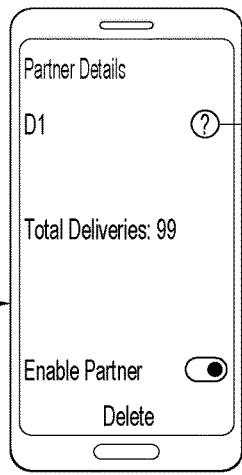
Figure 14C
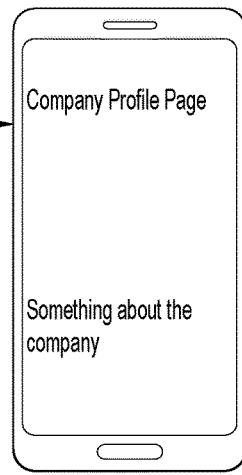
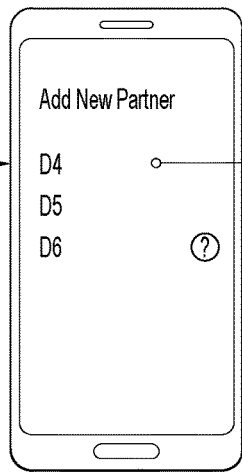
Figure 14D     Figure 14E
Figure 14F ized technology. Such as a push button. Conveniently, the delivery driver can

METHOD, SYSTEM AND SOFTWARE PRODUCT FOR PROVIDING TEMPORARY ACCESS TO AN AREA CONTROLLED BY NETWORK-CONNECTED ENDPOINT DEVICES

FIELD OF THE INVENTION

The invention concerns systems and methods for managing temporary access to areas controlled by network-connected endpoint devices such as garage door openers and secure parcel boxes. A non-limiting application of the invention is granting temporary access to an area controlled by a network-connected garage door opener or secure parcel box in order to facilitate the delivery of parcels thereto.

BACKGROUND OF THE INVENTION

Any discussion of documents, acts, materials, devices, articles and the like in this specification is included solely for the purpose of providing a context for the present invention. It is not suggested or represented that any of these matters formed part of the prior art base or were common general knowledge in the field relevant to the present invention as it existed in Australia or elsewhere before the priority date of each claim of this application.

Hubs that connect endpoint devices such as garage door and gate openers, parcel boxes, lighting, and heating and cooling systems to computer networks for communication and control are known. The Applicant's published PCT application no. WO 2016/058044 describes an example of such a hub that connects a garage door opener to a local area network and to the Internet. Network access allows the garage door opener to be locally and remotely monitored and controlled through an app installed on a user's smartphone, tablet or other computer device.

It is also known to grant temporary access to security infrastructure such as locks and garage door openers, so as to facilitate the home delivery of parcels or for other purposes. In this regard, U.S. Pat. No. 5,872,513 describes a system in which temporary access codes for a (non-networked) garage door are provided to a delivery driver. This allows the driver to open the garage door and deliver a parcel to a recipient even when the recipient is not home.

However, there has been little consideration given to the problems of granting temporary access to areas controlled by network-connected endpoint devices such as garage door openers. The present invention is concerned with managing temporary access to such areas.

SUMMARY OF THE INVENTION

According to a first aspect of the present invention, there is provided a method for providing temporary access to an area controlled by a network-connected endpoint device, the method including the steps of:
  enrolling an access partner in an account for the endpoint device maintained at an access server;
  receiving, from the access partner at the access server, requests for temporary access to the endpoint device; and
  activating the requests with the endpoint device such that the access partner is provided with temporary access to the area.

The present invention allows access partners, such as delivery drivers, to be provided temporary access to an area controlled by a network-connected endpoint device, such as a garage door opener or electronic lock for a secure parcel box. Temporary access is facilitated by enrolling the access provider in the account for the endpoint device that allows the user to access it over the Internet. Any security features that are built into that account can thus be leveraged to securely provide temporary access to the access partner.

Preferably, the request for temporary access includes a unique identifier of a wireless access device associated with the access partner. According to this embodiment, there is provided a hybrid system of temporary access control that includes an Internet-based component (in the form of the access server that receives requests for temporary access over the Internet) and a local component (in the form of a wireless access device carried by the access partner). Although requests for temporary access are received at the access server over the Internet, the request is ultimately sought by an access device in physical proximity to the endpoint device. Moreover, this ultimate request is transmitted to the endpoint device over a local wireless connection. Such a hybrid system has the advantage of increased user control over purely Internet-based system. In addition, the system is able to continue functioning even when the endpoint device disconnects from the Internet.

Typically, the request for temporary access is activated by the access server transmitting the unique identifier to the end-point device. According to this embodiment, the endpoint device is able to use the unique identifier received over the Internet to authenticate the access device after receiving a temporary access request therefrom.

Preferably, the wireless access device is adapted to wirelessly communicate over a communication channel with a transceiver located in physical proximity to the endpoint device.

Optimally, the endpoint device is configured to authenticate the wireless access device before providing temporary access. According to one embodiment, the authentication comprises:
  the transceiver obtaining an identifier from the wireless access device over the communication channel; and
  comparing the obtained identifier with the unique identifier stored on the endpoint device.

According to preferred embodiments, a private key is stored on the wireless access device. Such a private key can be used in an authentication routine for the access device. In this regard, the authentication routine may comprise:
  the transceiver obtaining the private key from the wireless access device over the communication channel; and
  decrypting the private key with a corresponding public key stored on the endpoint device.

According to preferred embodiments, the transceiver is configured to be activated by a manually-operable actuator, such as a push button. Conveniently, the delivery driver can simply press the button (which is typically located adjacent to the garage door or on or adjacent to the door of the parcel box) to commence the temporary access request process.

Preferably, the unique identifier is removed from the endpoint device after a temporary access permission parameter is no longer applicable. For example, the temporary access permission parameter can be a predetermined time or time period. If the delivery driver arrives outside of the designated time period, the temporary access request would fail, due to the identifier of the driver's access device not being available on the endpoint device.

Optionally, access partners can be enrolled into the endpoint device account by providing them with an identifier for the endpoint device. According to some embodiments, the access partner records this identifier in its own customer records for the customer associated with the endpoint device. Conveniently, this allows the customer to select the parcel delivery option described herein, when shopping at the access partner's online store.

According to a second aspect of the present invention, there is provided a system for providing temporary access to an area, comprising:
  a network-connected endpoint device having a processor and data storage, the endpoint device being adapted to send control signals to an access controller controlling access to the area;
  a transceiver communicatively coupled to the endpoint device that is capable of wirelessly detecting an access device in physical proximity thereto;
  the endpoint device having computer software stored thereon, which when executed by the processor:
    receives requests for temporary access to the area over the network;
    receives communications from the transceiver upon detection of a physically proximate access device seeking temporary access to the area; and
    sends a requisite control signal to the access controller to provide the sought temporary access to the area.

Preferably, the transceiver is arranged to be selectively actuated by operation of a manually-operable actuator, such as a push button mounted in physical proximity to the area to be accessed. The push button is positioned to be accessible to a person equipped with an access device who is seeking temporary access to the area. The actuation of the transceiver is required before the transceiver is able to wirelessly detect said access device.

This allows the transceiver to remain in a sleep state until operation of the actuator switches it into a wake state in which it can detect the access device, and this reduces the power requirements of the transceiver (which may be a battery powered unit) to a minimum. The access device may be arranged to switch back into the sleep state after a prescribed time.

The system may be configured such that a second operation of the manually-operable actuator, such as a second press of the push button within a certain time interval from the first press, results in termination of the temporary access to the area.

Preferably, requests for temporary access include a unique identifier for the access device.

Requests for temporary access may include a public key corresponding to a private key associated with the access device.

Preferably, the computer software authenticates the access device prior to providing temporary access to the area.

According to one embodiment, the authentication comprises:
  the transceiver obtaining a unique identifier from the access device; and
  comparing the obtained unique identifier with the unique identifier received over the network.

The authentication may also comprise:
  the transceiver obtaining data from the access device encrypted by the private key; and
  decrypting the data with the public key.

Preferably, the computer software removes the unique identifier from the endpoint device after a temporary access permission parameter is no longer applicable.

According to a third aspect of the present invention there is provided a method for issuing a command to a network-connected endpoint device, the method including the steps of:

receiving a command request, the request including an access credential having a delivery address associated therewith, and geographical location data of the issuer of the command request;
  authenticating the access credential;
  determining whether the geographical location data is within a sufficient proximity to the delivery address; and
  in the event of successful authentication of the access credential and determination of sufficient proximity, issuing a command to an endpoint device stored in a database in association with the delivery address.

According to a fourth aspect of the present invention there is provided a method for providing temporary access to a network-connected endpoint device, the method including the steps of:
  issuing a temporary access credential to a client device;
  receiving from the client device at a first server, an access request that is digitally signed using a digital signature, the access request including the temporary access credential; and
  forwarding the digitally signed access request to a second server that is associated with the endpoint device, the second server being configured to authenticate the access request using the digital signature.

Reference in this specification to 'one embodiment' or 'an embodiment' means that a particular feature, structure, or characteristic described in connection with the embodiment is included in at least one embodiment of the present invention. Thus, where phrases such as 'in one embodiment' or 'in an embodiment' appear, they do not necessarily refer to the same embodiment. Furthermore, the particular features, structures, or characteristics described herein may be combined in any suitable manner in one or more combinations.

BRIEF DESCRIPTION OF THE DRAWINGS

To enable a clearer understanding, the invention will now be further explained and illustrated with regard to an exemplary non-limiting embodiment, with reference to the accompanying drawings, in which:

FIG. 1 is a schematic illustration of the network-connected endpoint device environment in which embodiments of the present invention operate;

FIGS. 12 to 14 are illustrations of user interfaces for the smartphone app used in the temporary access system according to the invention.

DETAILED DESCRIPTION OF THE EMBODIMENTS

Figure 1A:
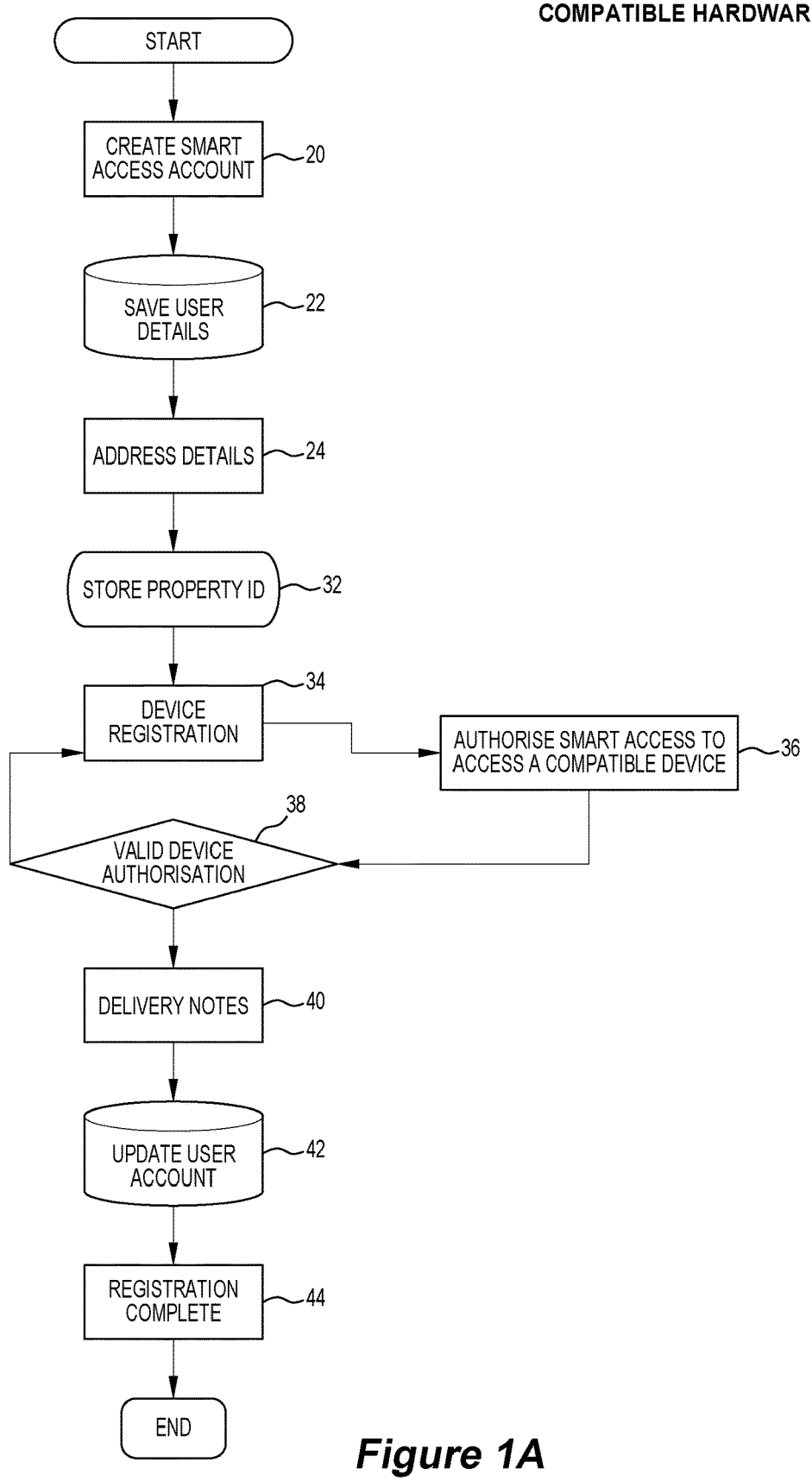
FIG. 1A is a flowchart illustrating the technical and procedural steps undertaken by a user when enrolling in a delivery system in accordance with an embodiment of the invention.

Turning to FIG. 1, the invention will be described by reference to an exemplary embodiment of facilitating temporary access to a garage door opener or secure parcel box that is connected to the Internet by way of a network-connected endpoint device (such as a hub) for the purpose of facilitating parcel delivery. However, it will be realised that the invention will have wider applications, such as allowing temporary access for the delivery of goods (such as groceries and takeaway food) and allowing temporary access to guests, tradespersons and other parties.

In this specification, this system for facilitating temporary access will be referred to as the 'Smart Access system' or 'Jungle Access system'. These systems are delivered and managed by a server that connects the hub to the Internet. This server is referred to herein as a 'Smart Access Server' 180 or simply an 'Access Server'. Although illustrated as a single server, those skilled in the art will realise that the service is likely to be implemented on a suitable data centre hosting a cloud-based distributed architecture. The low-level details of such architectures do not form part of the present invention and will only be described in the level of detail necessary to illustrate the present invention. The use of the term 'server' in this specification and claims is to be understood as embracing a spectrum of server hardware and software spanning from single devices to cloud-based distributed infrastructure.

The network-connected garage door opener or parcel box is illustrated in FIG. 1 as 'Compatible Hardware' 100. As described in detail in the Applicant's published PCT application WO 2016/058044, Compatible Hardware 100 includes a central, network-connected hub that is in (typically radio) communication with the garage door opener or secure parcel box. The hub is also in communication with a compatible hardware system being an Internet-connected server 120.

Although server 120 is illustrated as a single server, those skilled in the art will realise that the necessary functionality may be implemented on any suitable system, such as a data centre hosting a cloud-based distributed architecture.

Skilled addressees will realise that the network-connected hub system managed on Internet-connected server 120 and the Smart Access system provided on Smart Access Server 180 could be provided by way of a single software platform rather than two separate systems. An example of a single platform system is described in detail below. However, where the functionality is provided on multiple systems, they are in communication with each other over the Internet.

The Smart Access system facilitates the granting by Users 110 of temporary access to Compatible Hardware 100 to third party access providers such as Delivery Drivers 160. Limitations on the access can be applied by Users 110. In the embodiment described below, the limitations are temporal, in the sense that Delivery Drivers are provided with access that expires after a predetermined time period. Other forms of limitation can be applied, such as by reference to identity or other authorisation category. A User 110's settings for temporary access limitations can be stored in an access profile created for the User 110.

Delivery Driver 160 is responsible for the 'last mile' delivery (typically from a distribution centre to the premises where the Compatible Hardware 100 is installed). As described in further detail below, Delivery Driver 160 issues commands to activate Compatible Hardware 100.

As described in further detail below, Delivery Driver 160 is in communication with a Delivery Partner System 140 that in turn communicates with a Smart Access Server 180. A Smart Access Delivery Partner API is stored on Smart Access Server 180 to provide overall system functionality.

Alternatively, Delivery Driver 160 may access Smart Access Server 180 directly.

Delivery Partner System 140 includes suitable facilities to operate their delivery business, including ERP and parcel tracking systems. The present invention can interface with a wide variety of such systems. They will thus not be described at a level of abstraction lower than is required to describe the present invention.

Users 110 sign up for the Smart Access system by accessing Smart Access Server 180 through an Internet-connected device such as a wireless smartphone or tablet (through a suitable app installed thereon) or computer (through a web browser).

The Smart Access system 180 allows users to view histories of deliveries, view status of deliveries and opt in and out of using the system for particular deliveries or altogether. The access profile discussed above can also be created and managed on smart access system 180.

User Interface

Each Smart Access User 110 is required to register in order to use the system. The necessary information required by Smart Access Server 110 to operate the system and thus provide secure temporary access to User 110's Compatible Hardware 100 is collected during the registration process. The information can of course be updated or changed at any time once registered.

Figure 1B:
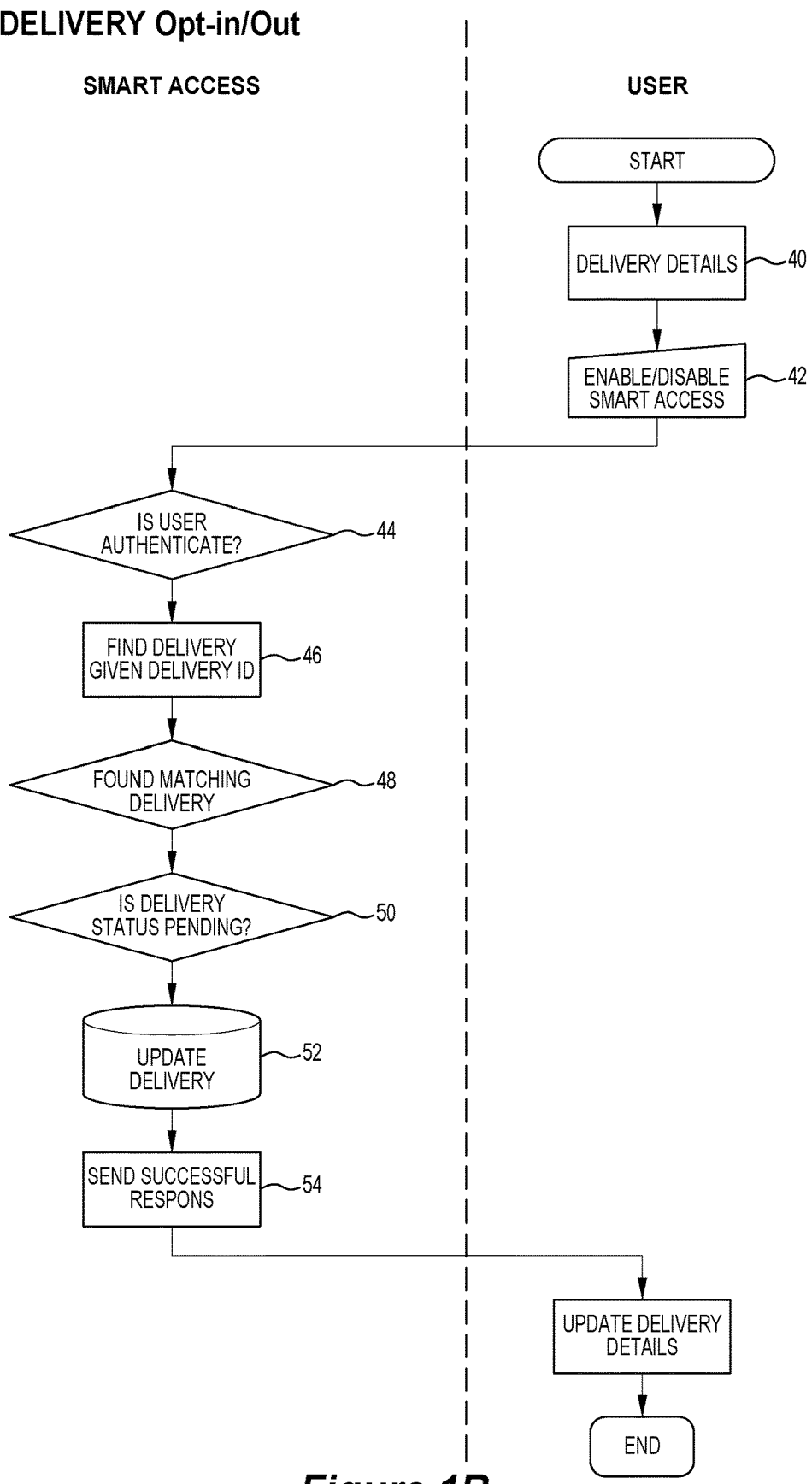
FIG. 1B is a flowchart illustrating the opting in and out of a delivery system in accordance with an embodiment of the invention.

An example of a user registration process is described by reference to FIG. 1A. At step 20, a prospective user accesses Smart Access Server 180, typically via a web browser or dedicated app installed in User 110's smartphone or tablet, and creates an account. User 110 typically provides an email address, password, name and contact telephone number in order to open an account. These user details are saved to a database accessible to Smart Access Server 180 (step 22), typically in the form of a unique user record.

At step 24, User 110 enters details of a physical address to which deliveries are to be made. Currently required address details are: street address, suburb, post code and state.

At step 32, a unique identifier for the address is stored in the user record.

At step 34, User 110 is asked to link the created Smart Access Account to their Compatible Hardware 100. Typically, the linkage request proceeds by displaying a list of compatible hardware devices and requesting the user to select the particular device.

At step 36 Smart Access Server 180 requests authorisation from Compatible Hardware 100 by way of Server 120. The precise implementation of the authorisation is dependent on the particular systems installed on Server 120 and Compatible Hardware 100 and, in the case of a single platform systems, this authorisation step may not be required. For multi-platform systems, a recommended minimum is to require a unique access credential to be supplied by Smart Access Server 180 to Server 120 and returned to Smart Access Server 180.

At step 38, Smart Access Server 180 verifies the response from Server 120 to ensure that it was successful and contains valid access credentials.

User 110 can optionally enter delivery notes (step 40) that will be provided to Delivery Driver 160. Such notes include useful information about deliveries such as the location of preferred delivery locations (such as inside a garage), location of a parcel box and the like. User 110's record is updated at step 42, whereupon the registration is complete (step 44).

User 110 also has the ability to opt in or out of using Smart Access either for specific deliveries or entirely. In the event that Smart Access is deactivated for a particular delivery, then delivery will be completed through the normal delivery route. An example of a specific delivery deactivation process is described by reference to FIG. 1B. At step 40, User 110 views details of the specific delivery on the app installed on their smartphone.

At step 42 User 110 issues a request to Smart Access Server 180 to deactivate Smart Access for the selected delivery. The request contains: User authentication details; a Delivery ID; and preference data pertaining to the deactivation request. At step 44, the request is received at Smart Access Server 180 and a determination made as to whether User 110 is authenticated. This involves Smart Access Server 180 verifying that the user making the request is registered in the system and has the necessary access privileges to modify the selected delivery.

At step 46, the particular delivery is located in the database using the Delivery ID as a search key. In the event that the delivery is located, a determination is made (step 48) as to whether the located delivery is registered to that particular user. Next (step 50), the status of the delivery is queried and if found to be 'pending' is updated in accordance with the preferences supplied by the user in the initial request.

A success response message is sent to User 110 (step 54) to inform them about the success (or otherwise) of the delivery deactivation request. This is used to update the display on User 110's smartphone to show the current preferences for the delivery.

Figure 2:
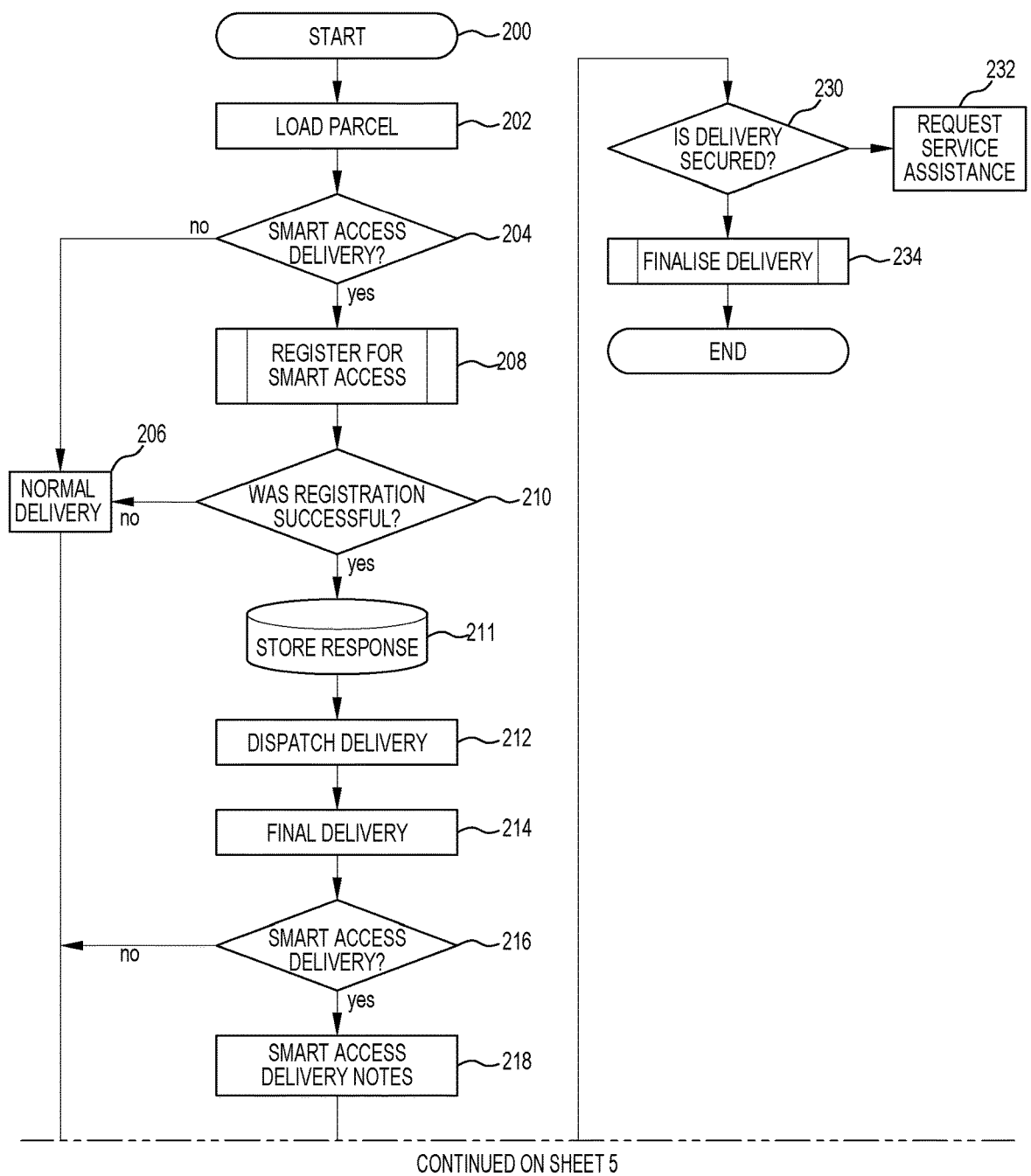
FIG. 2 is a flowchart giving a high level overview of a delivery system in accordance with an embodiment of the invention.
Figure 2:
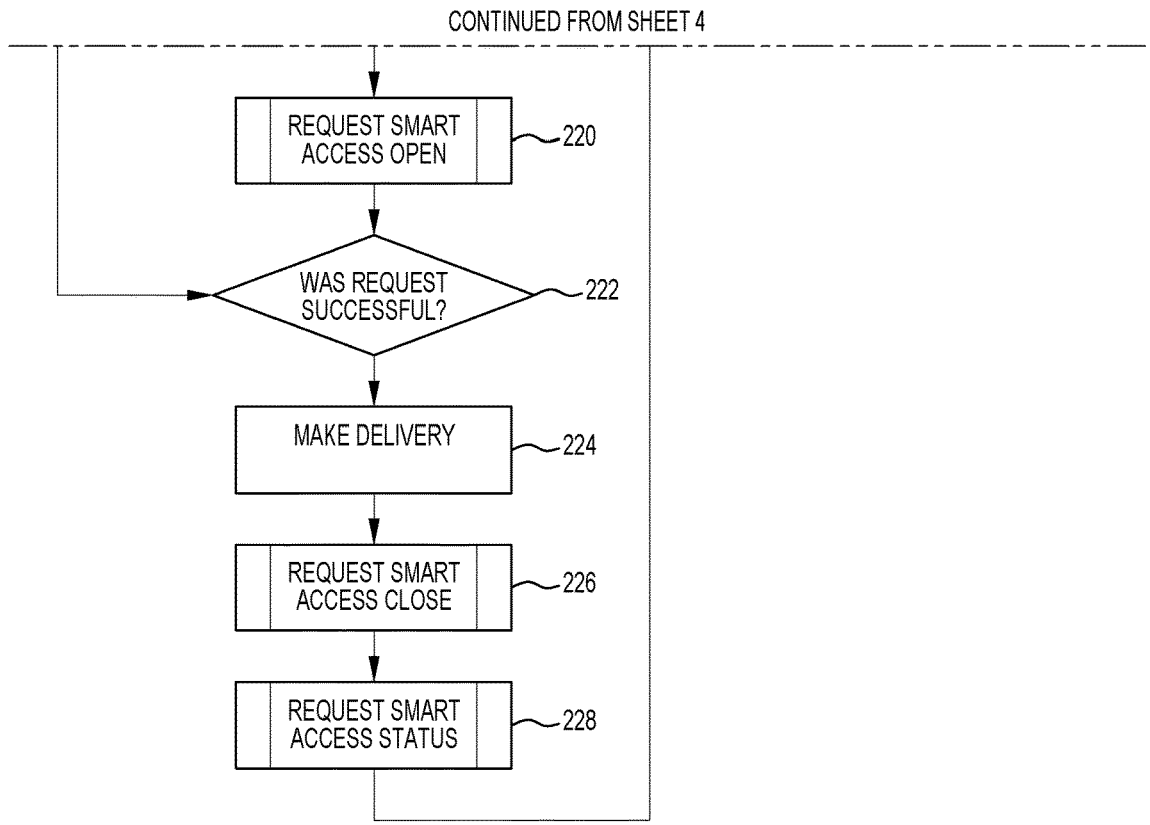

An overview of the process flows involved in a typical delivery is provided by reference to FIG. 2. The process commences at step 200 and at step 202 a parcel is prepared for last-mile delivery by being scanned into the Delivery Partner 140 tracking system. At step 204 a determination is made by the tracking system of whether User 110 is enrolled in the Smart Access delivery system.

In the event that the user is not enrolled, the current delivery proceeds at step 206 as a normal delivery. A normal delivery is defined by reference to the delivery partner's tracking system and may require signature for delivery, placement in a post box and the like.

In the event that User 110 is enrolled in the Smart Access delivery system, the process moves to step 208, at which the particular parcel is registered for Smart Access delivery. Details of the registration process are provided below.

A determination is made at step 210 of whether this registration was successful. Unsuccessful registrations result in process control being re-directed to a normal delivery 206. As described below, successful registrations result in Smart Access Server 180 (or Server 120) receiving:

a unique access token; and delivery notes from User 110.

Typically, delivery notes include information of use to Delivery Driver 160 such as the location of a parcel box to be unlocked or a safe location in the garage that is closed by the garage door controller, where the parcel is to be left.

It will be realised that steps 202-210 will typically be performed at the one time for each of the parcels for which the delivery driver is instructed to deliver. Typically, the scanning occurs at the commencement of the driver's delivery shift at the distribution centre.

At step 212, the parcel is dispatched for delivery to the appropriate address.

Upon arrival at the delivery address (step 214) Delivery Driver 160 again scans the parcel into tracking system and at step 216 a second determination is made of whether the delivery is registered for Smart Access delivery. This second determination is made to ensure that Smart Access for the delivery is still desired by User 110. A User's circumstances may change (perhaps at the last minute) and a Smart Access delivery may no longer be convenient or appropriate. As discussed above, User 110 is able to revoke the permission for a Smart Access delivery right up until the delivery is complete. Performing this second determination allows for maximum flexibility in this regard.

If the delivery is not to be made by Smart Access, for example if User 110 recently deactivated Smart Access delivery due to changing circumstances, the process returns to step 206 whereupon a normal delivery is undertaken.

If the delivery is still to be made by way of Smart Access, the delivery proceeds according to that methodology. This involves, at step 218 the display to Delivery Driver 160 of any notes associated with the delivery. These notes are obtained from Smart Access Server 180 as necessary.

Once ready, at step 220, Delivery Driver 160 issues a command through an application installed on their smartphone or tablet (not shown) to open the recipient's Smart Access controlled device. The technical steps involved in issuing such a command are described in detail below.

A determination is made at step 222 of whether the open command was successful. The process returns to step 206 in the event of an unsuccessful command, whereupon the package is delivered in the normal manner.

In the event of a successful opening of the Smart Access device, the driver completes the delivery in the manner prescribed in the delivery notes. The fact of successful delivery is entered into the tracking system in the usual manner.

Subsequent to successful delivery, at step 226, Delivery Driver 160 issues a request to close the Smart Access device 100. To confirm that the device has successfully closed and secured, the status of the device is updated (step 228).

Prior to leaving the customer's premises, Delivery Driver 160 (at step 230) is required to wait until the device is properly secured. In the event of a security failure, the driver is required to request (step 232) service assistance. The delivery is finalised (step 234) in the event of a secured device determination.

Partner API Request

For security reasons, requests through the installed app to the Smart Access Delivery Partner API on Smart Access Server 180 are digitally signed. This enables requests to be validated and authenticated by downstream systems such as those running on Server 120 and Compatible Hardware 100. In the case of single-platform systems, digitally signed requests are provided directly to Server 120. The request methodology involves the app first including a number of parameters (see below) in a request to Smart Access Server 180 or Server 120. A message digest, in the form of a string comprising the parameter name concatenated with the parameter value, is generated for each request. Each request is digitally signed according to a suitable electronic signature policy (such as RFC 3125) using a public/private key pair. The message signature and public certificate are appended to the request so that it can be verified by other parties. The user is then able to make a network request to Smart Access Server 180.

Partner API Authentication

Figure 3:
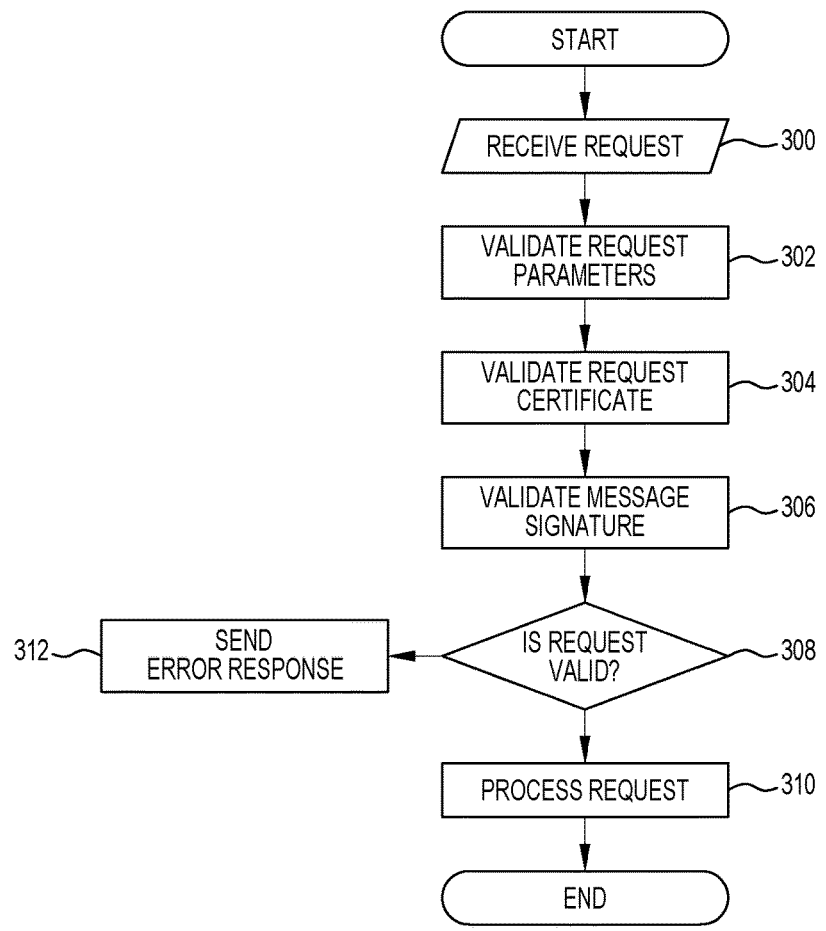
FIG. 3 is a flowchart illustrating the authentication of requests to a server implementing an embodiment of the invention.

Requests from delivery partners are validated by Smart Access Server 180 (or Server 120 in the case of a single platform system). An exemplary validation routine is described by reference to FIG. 3. At step 300, the request from the delivery partner is received. This must be validated prior to actioning. At step 302, each of the parameters included in the request are validated against a set of logical rules present on Smart Access Server 180. The request is only accepted in the event that all of the parameters are found to be valid.

Requests received at Smart Access Server 180 also include a public digital certificate. According to the Authentication Routine, at step 304, the digital certificate is validated in accordance with RFC 5280, or by reference to other suitable Public Key Infrastructure standards. The certificate must be signed by a known and trusted Certificate Authority to ensure that the request originates from a trusted partner.

At step 306, the request signature is validated using RFC 3126 (or similar). The validation process involves recreating the message signature using the request parameters and public certificate. If the recreated signature and the signature included in the request are the same, the request is known to be genuine and has not been changed during communication from the sender to Smart Access Server 180.

A determination is made at step 308 as to whether all validations (i.e of parameters, certificate and signature) are successful, with the overall request considered to be valid if this determination is passed. The request is processed if found to be valid (step 310) and an error response sent (step 312) if not.

Register Delivery

Figure 4:
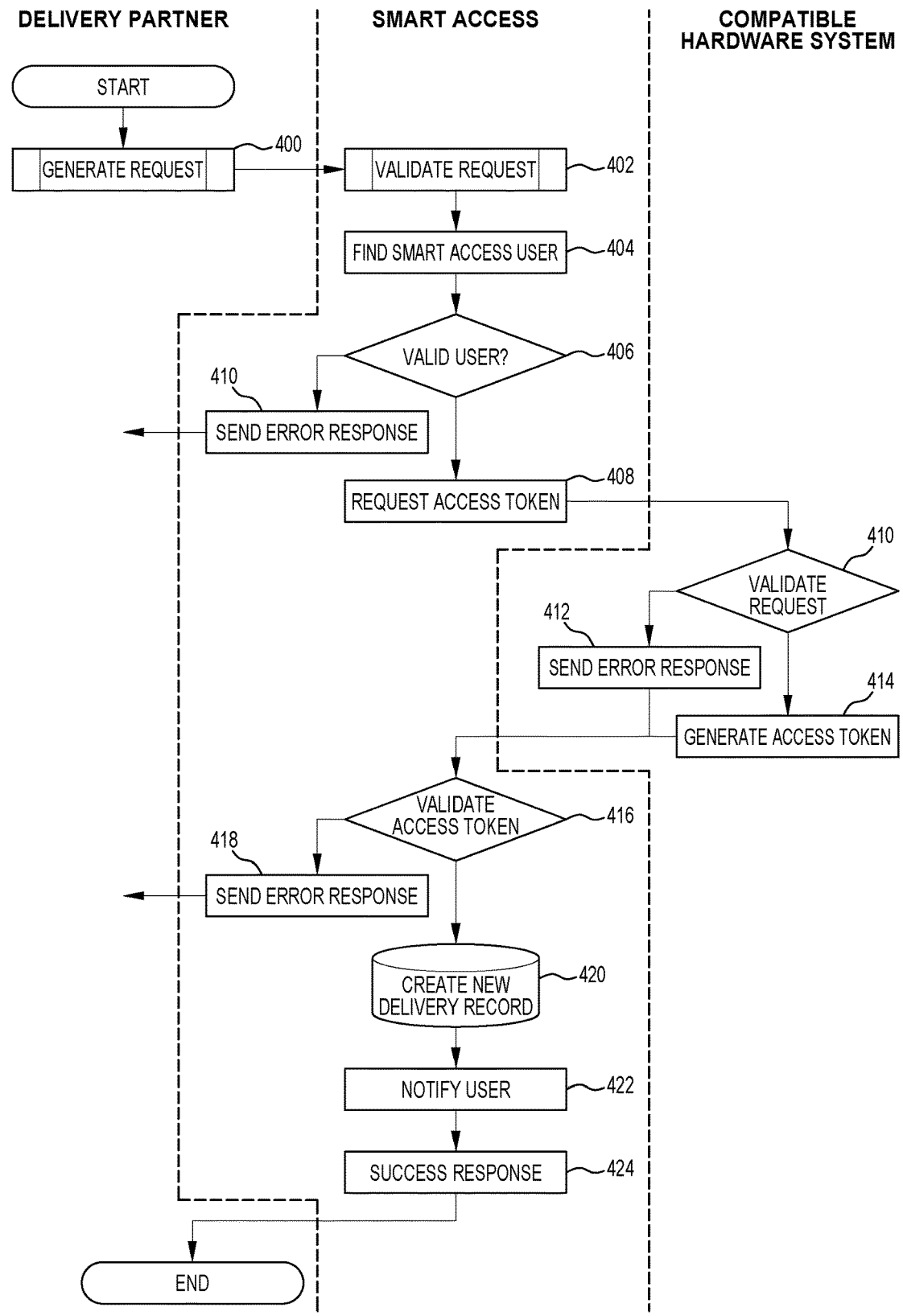
FIG. 4 is a flowchart illustrating the technical and procedural steps undertaken to register a particular delivery into a delivery system in accordance with an embodiment of the invention.

The technical and procedural steps undertaken to register a delivery with the Smart Access system are described by reference to FIG. 4. At step 400 a request to create a new delivery is generated and transmitted to Smart Access Server 180. The request is triggered when a parcel is loaded for final delivery and scanned into the tracking system. The request includes the following parameters:

Consignment ID—a pseudo unique identifier for the delivery used to uniquely identify the delivery.

Delivery Address—an identifier used to determine the delivery point for the parcel.

Delivery Driver Information—this information is included so that it can be displayed to the user and nominally includes, Name, Photo, Car Description & Registration Number Delivery Information—includes specific information on the delivery and nominally includes: shipper, delivery address, addressee, description, link to tracking URL Delivery Window—a time window in which access to the Smart Access device will be allowed. If an open/close/finalise request is made outside this window, no access will be given.

At step 402, the request is validated using the methodology described above. In the event of a successful validation, at step 404, Smart Access Server 180 searches for a User who is registered with an address included in the request. If a valid user is found (step 406) the process moves on to step 408 or an error message returned (step 410)

At Step 408, a request is made over the Internet to Server 120 for an access token, said Server being linked to the User 110's Smart Access account during set up. The request uses the appropriate authentication details for the linked Hardware 100 as configured by the user. Any requests to linked Hardware 100 include the original request from Delivery Partner System 140 including the signature and public certificate. This is to allow Hardware System 100 to verify that the request has originated from a trusted partner.

Hardware System 100 and/or Server 120 validate the request (step 410). The exact implementation of the validation routine depends on the settings of individual Hardware Systems and Servers 100 and 120. A suggested minimum standard involves System 100 checking that the authentication credentials provided in the request are correct. System 100 also verifies that the original request from Delivery Partner 140 are valid according to the authentication routine described above. An error response (step 412) is forwarded in the case of an invalid request.

Alternatively, in the event of a successful validation, Server 120 generates an access token (step 414). The access token is essentially a set of unique access credentials for the particular delivery. The access credentials allow subsequent requests to be made to Smart Access Server 180. Without the access credentials, no access is provided to the Compatible Hardware 100. The access credentials are valid only in respect of the specific consignment ID; Delivery Partner; and time window parameters.

The generated access token is validated (step 416) by Smart Access Server 180 and an error response sent (step 418) in the event of an unsuccessful validation.

At step 420 a new delivery record is created on Smart Access Server 180.

The following information is stored in the delivery record:
User ID
Property address
Consignment ID
Delivery Driver Info
Delivery Information
Delivery Window
Delivery Status is set to 'Pending'

User 110 is notified (step 422) about the creation of new delivery records, typically through a push notification to their smart phone. A success response is then returned (step 424) that includes the access credentials for the Compatible Hardware 100 that must be used for subsequent requests.

Open Request

Figure 5:
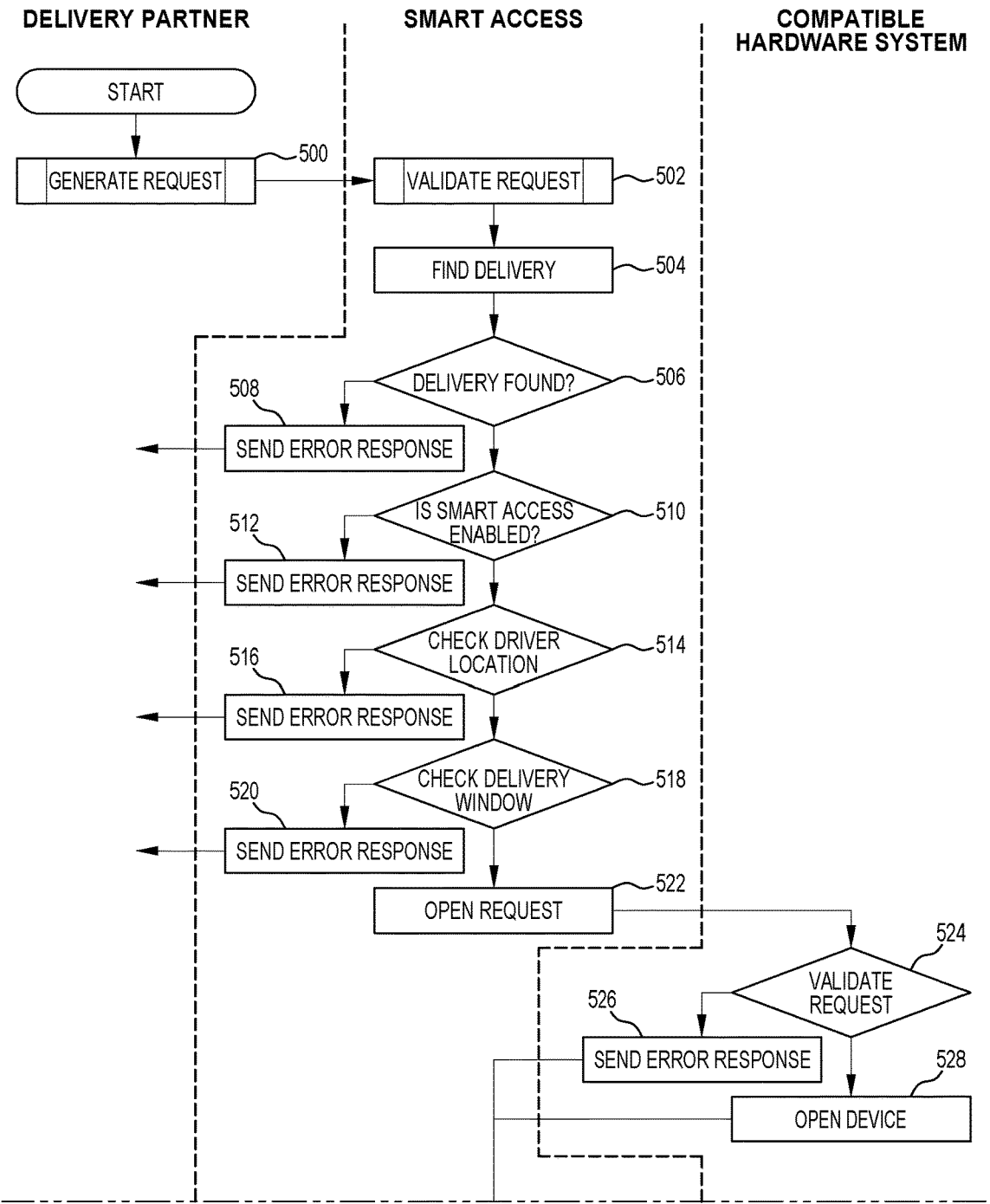
FIG. 5 is a flowchart illustrating the technical and procedural steps undertaken to issue a command to open a network-connected endpoint device.
Figure 5:
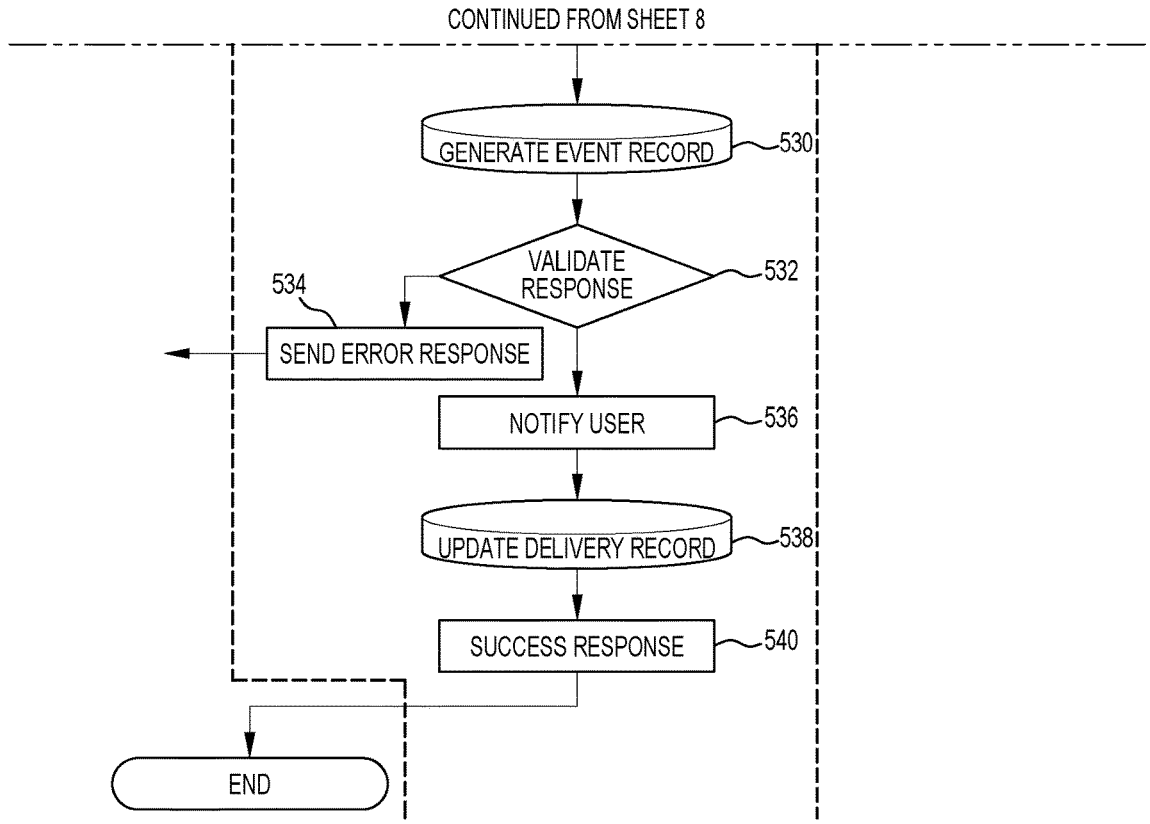

As described above, Delivery Driver 160 issues a request to open user's 110 Compatible Hardware 100 in order to deliver the package. The technical steps performed in order to issue such a request are described by reference to FIG. 5.

At step 500 Delivery Partner 140 (or Delivery Driver 160) generates a request in the manner described above that includes the following parameters:

Consignment ID—(see above)

Access Credentials—the specific access credentials required for this delivery as returned in the Generate Access Token step (step 414).

Driver Location—The location (longitude/latitude) of the driver

Driver Identification—A unique identifier of the driver

The request is forwarded to Smart Access Server 180 (or Server 120) at which it is validated (step 502) according to the Authentication routine described above. Subsequent to verification, at step 504, Smart Access Server 180 attempts to locate the delivery in its database by interrogation on the basis of a suitable search key such as the Consignment ID. At this stage, the Delivery Status Parameter has a value of either 'Pending' or 'In Progress'.

In the event of an unsuccessful location (step 506) an error response is sent to Delivery Partner 140 (step 508). If the delivery is located, a determination is made (step 510) of whether Smart Access has been enabled. Again, an error message is returned (step 512) to Delivery Partner 140 if Smart Access is not enabled.

At step 514, the driver location is checked. This is performed by comparing the Driver Location parameter included in the request against the known location of the delivery point (determined through suitable public information sources). If the driver is located within an acceptable proximity to the delivery location the process continues to the next step; otherwise an error message is returned (step 516).

At step 518, the delivery window is checked by comparing the Delivery Window parameter against the current time. An error message is sent (step 520) in the event that the request is made outside of the delivery window.

If the delivery window is still open, an open request is made by Smart Access Server 180 to Server 120 (step 522). The request uses the authentication details for the linked hardware set by the user and includes the original request from Delivery Partner 140, including the digital signature and public certificate. This allows Server 120 to verify the request.

This verification by Server 120 (step 524) is dependent on the particular installed implementation. A suggested minimum standard is for Server 120 to check that the authentication credentials provided in the request are correct. Server 120 also should verify the original request in a similar manner to the verification performed by Smart Access Server 180. An error response is forwarded to Smart Access Server 180 in the event of an unsuccessful verification (step 526).

If the verification is successful, Compatible Hardware 100 actions the open command, opens the linked device (step 528) and returns a response reporting the success (or otherwise) of the opening operation.

Smart Access Server 180 maintains a log of all events associated with the delivery. The log is updated by the generation of a suitable event record (step 530). Typically, the event record records the following data items:

Link to the specific delivery record
Date and time of request
The request type
Driver identification
Driver location
Response details from the compatible hardware Responses received from Server 120 are validated (step 532) and, if unsuccessful, an error message is sent to Delivery Partner 140 (step 534). User 110 is notified (step 536) about a successful opening operation, typically by way of a push notification.

At step 538, the delivery status in the delivery record is updated to a value of 'In Progress'. A success response is then forwarded to Delivery Partner 140 (step 540).

Close Request

Figure 6:
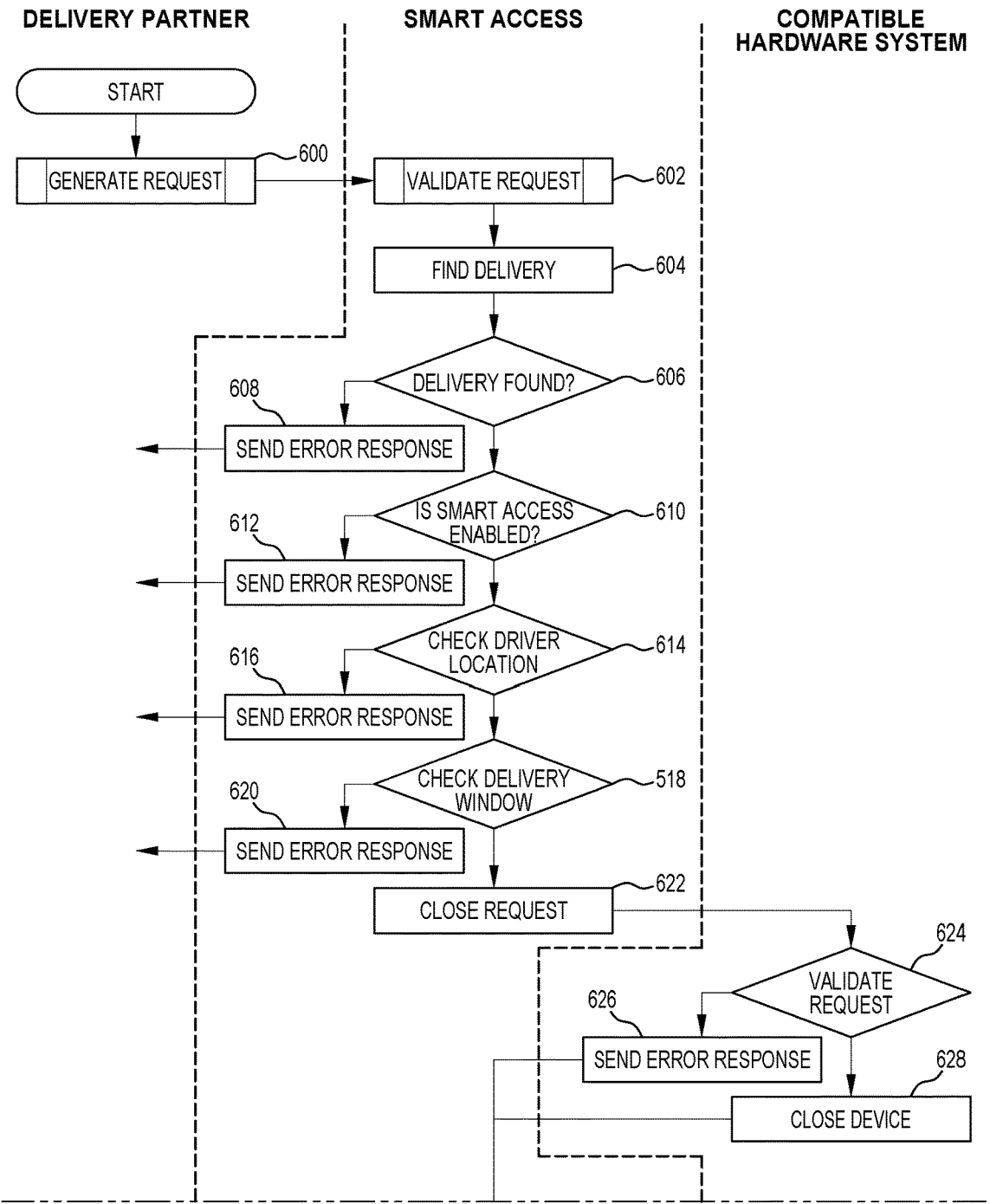
FIG. 6 is a flowchart illustrating the technical and procedural steps undertaken to issue a command to close a network-connected endpoint device.
Figure 6:
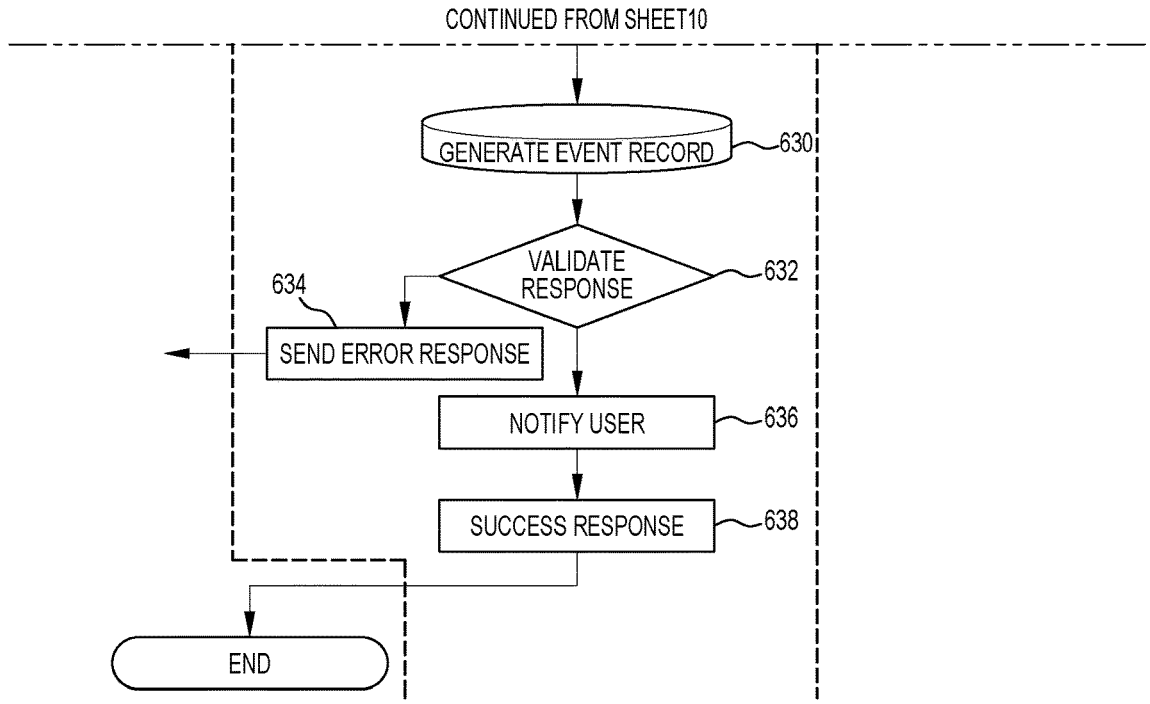

As described above, Delivery Driver 160 issues a command to close the controlled device after the delivery is made in accordance with the delivery notes. The technical steps performed in order to issue such a request are described by reference to FIG. 6. At step 600 a request is generated at Delivery Partner 140 that includes the following parameters:

Consignment ID—(see above)

Property Address—(see above)

Access Credentials—the specific access credentials required for this delivery as returned in the Generate Access Token step (step 414).

Driver Location—The location (longitude/latitude) of the driver

Driver Identification—A unique identifier of the driver

The request is forwarded to Smart Access Server 180 at which it is validated (step 602) according to the Authentication routine described above. Subsequent to verification, at step 604, Smart Access Server 180 attempts to locate the delivery in its database by interrogation on the basis of a suitable search key such as the Consignment ID. At this stage, the Delivery Status Parameter has a value of either 'Pending' or 'In Progress'.

In the event of an unsuccessful location (step 606) an error response is sent to Delivery Partner 140 (step 608). If the delivery is located, a determination is made (step 610) of whether Smart Access has been enabled. Again, an error message is returned (step 612) to Delivery Partner 140 if Smart Access is not enabled.

At step 614, the driver location is checked. This is performed by comparing the Driver Location parameter included in the request against the known location of the delivery point (determined through suitable means). If the driver is located within an acceptance proximity to the delivery location the process continues to the next step; otherwise an error message is returned (step 616).

At step 618, the delivery window is checked by comparing the Delivery Window parameter against the current time. An error message is sent (step 620) in the event that the request is made outside of the delivery window.

If the delivery window is still open, a close request is made by Smart Access Server 180 to Server 120 (step 622). The request uses the authentication details for the linked hardware set by the user and includes the original request from Delivery Partner 140, including the digital signature and public certificate. This allows Server 120 to verify the request.

This verification by Server 120 (step 624) is dependent on the particular installed implementation. A suggested minimum standard is for Server 120 to check that the authentication credentials provided in the request are correct. Server 120 also should verify the original request in a similar manner to the verification performed by Smart Access Server 180. An error response is forwarded to Smart Access Server 180 in the event of an unsuccessful verification (step 626).

If the verification is successful, Compatible Hardware 100 actions the close command, closes the linked device (step 628) and returns a response reporting the success (or otherwise) of the opening operation.

As discussed above, Smart Access Server 180 maintains a log of all events associated with the delivery. The log is updated by the generation of a suitable event record (step 630). Typically, the event record records the following data items:

- Link to the specific delivery record
- Date and time of request
- The request type
- Driver identification
- Driver location
- Response details from the compatible hardware Responses received from Server 120 are validated (step 632) and if unsuccessful, an error message is sent to Delivery Partner 140 (step 634). User 110 is notified (step 636) about a successful closing operation, typically by way of a push notification to the user's smartphone. A success response is then forwarded to Delivery Partner 140 (step 638).

Finalise Request

Figure 7:
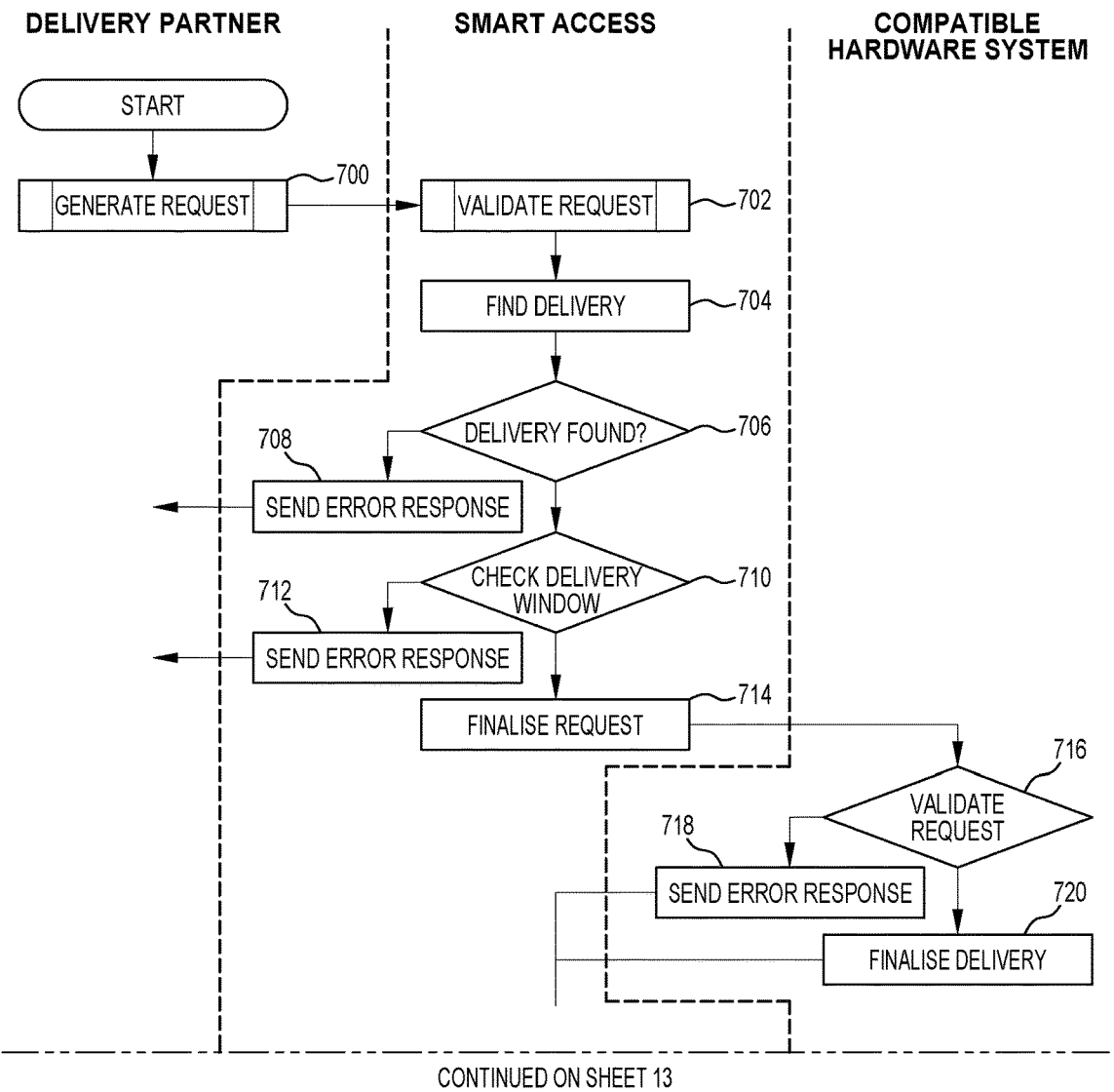
FIG. 7 is a flowchart illustrating the technical and procedural steps undertaken to finalise a delivery made in a delivery system in accordance with an embodiment of the invention.
Figure 7:
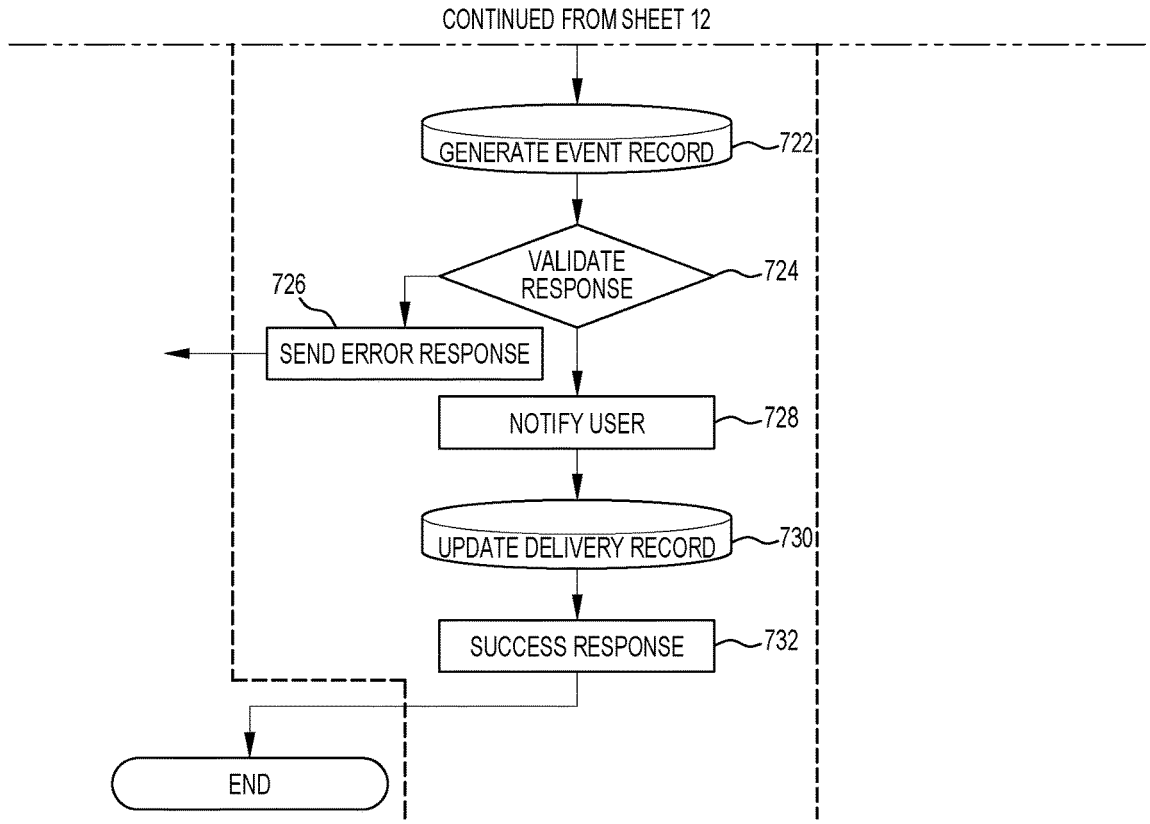

As discussed above, the delivery methodology involves Delivery Driver 160 sending a finalisation request to Smart Access Server 180 after the delivery is completed and the user's device indicated to be secure. The technical steps performed in order to issue such a request are described by reference to FIG. 7.

At step 700 Delivery Partner 140 (or Delivery Driver 160) generates a request in the manner described above that includes the following parameters:

- Consignment ID—(see above)
- Property Address—(see above)
- Access Credentials—the specific access credentials required for this delivery as returned in the Generate Access Token step (step 414).
- Driver Location—The location (longitude/latitude) of the driver
- Driver Identification—A unique identifier of the driver
- Delivery Status—Confirmation from Delivery Driver 160 on the status of the delivery (successful or otherwise).

The request is forwarded to Smart Access Server 180 at which it is validated (step 702) according to the Authentication routine described above. Subsequent to verification, at step 704, Smart Access Server 180 attempts to locate the delivery in its database by interrogation on the basis of a suitable search key such as the Consignment ID. At this stage, the Delivery Status Parameter has a value of either 'Pending' or 'In Progress'.

In the event of an unsuccessful location (step 706) an error response is sent to Delivery Partner 140 (step 708). If the delivery is located, the process proceeds to checking the delivery window (step 710) by comparing the Delivery Window parameter against the current time. An error message is sent (step 712) in the event that the request is made outside of the delivery window.

If the delivery window is still open, a finalise request is made by Smart Access Server 180 to Server 120 (step 714). The request uses the authentication details for the linked hardware set by the user and includes the original request from Delivery Partner 140, including the digital signature and public certificate. This allows Server 120 to verify the request.

This verification by Server 120 (step 524) is dependent on the particular installed implementation. A suggested minimum standard is for Server 120 to check that the authentication credentials provided in the request are correct. Server 120 also should verify the original request in a similar manner to the verification performed by Smart Access Server 180. An error response is forwarded to Smart Access Server 180 in the event of an unsuccessful verification (step 718).

If the verification is successful, Compatible Hardware 100 actions the finalise delivery command by revoking the access credentials for the specific delivery and returns a response reporting the success (or otherwise) of the operation.

The log maintained by Smart Access Server 180 is updated by the generation of a suitable event record (step 722). Typically, the event record records the following data items:

- Link to the specific delivery record
- Date and time of request
- The request type
- Driver identification
- Driver location
- Response details from the compatible hardware Responses received from Server 120 are validated (step 724) and if unsuccessful, an error message is sent to Delivery Partner 140 (step 726). User 110 is notified (step 728) about the completion of the delivery by Delivery Driver 160, typically by way of a push notification to User 110's smartphone.

At step 730, the delivery status in the delivery record is updated to a value of 'Finalised'. A success response is then forwarded to Delivery Partner 140 (step 732).

Status Request

Figure 8:
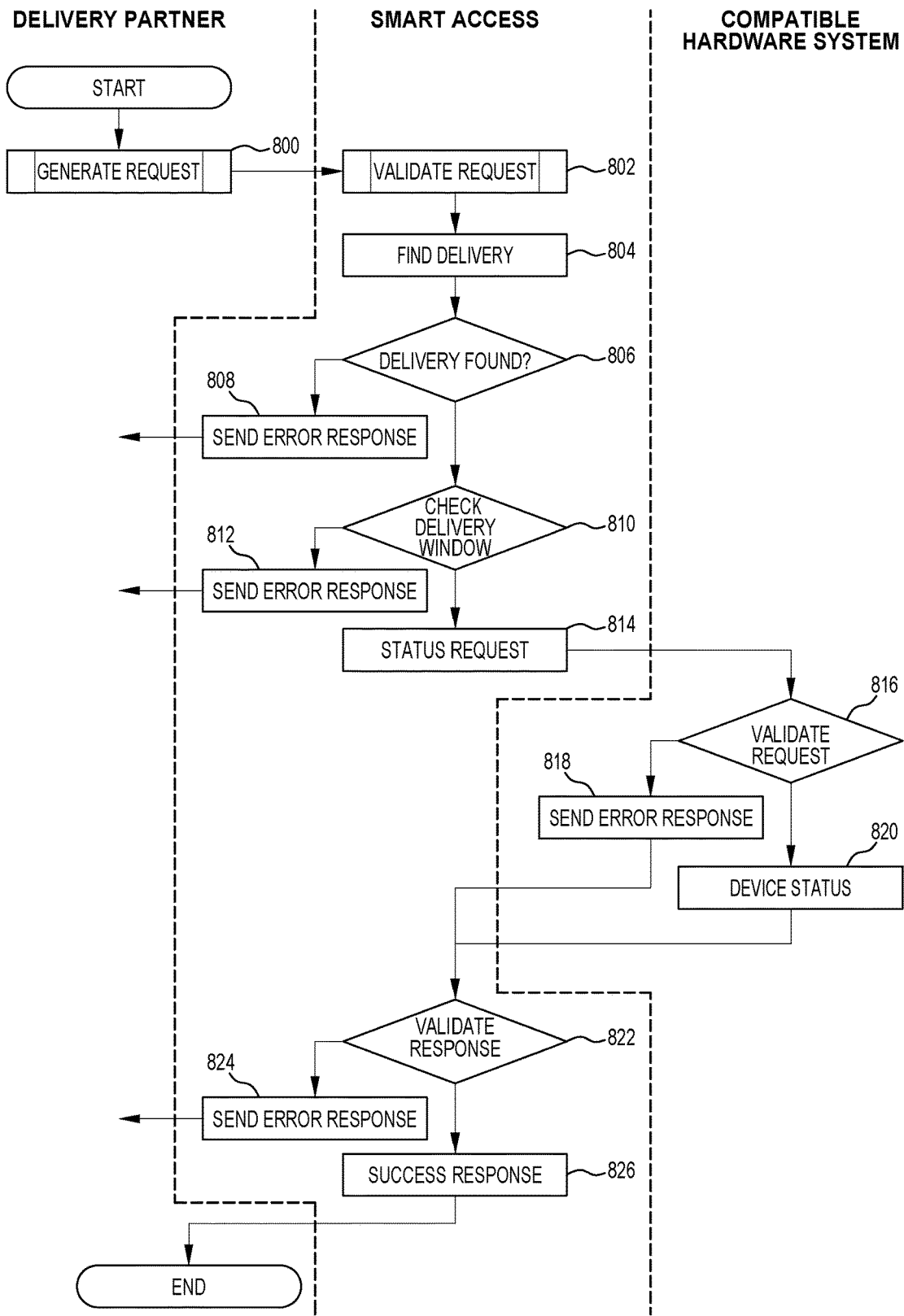
FIG. 8 is a flowchart illustrating the technical and procedural steps undertaken to issue a status request to a network-connected endpoint device.

The system enables Delivery Partner 140 to obtain information pertaining to the status of particular deliveries and the status of User 110's device. The technical steps performed in order to issue such a status request are described by reference to FIG. 8. At step 800 a request is generated at Delivery Partner 140 that includes the following parameters:

- Consignment ID—(see above)
- Property Address—(see above)
- Access Credentials—the specific access credentials required for this delivery as returned in the Generate Access Token step (step 414).
- Driver Location—The location (longitude/latitude) of the driver
- Driver Identification—A unique identifier of the driver The request is forwarded to Smart Access Server 180 at which it is validated (step 802) according to the Authentication routine described above. Subsequent to verification, at step 804, Smart Access Server 180 attempts to locate the delivery in its database by interrogation on the basis of a suitable search key such as the Consignment ID. At this stage, the Delivery Status Parameter has a value of either 'Pending' or 'In Progress'.

In the event of an unsuccessful location (step 806) an error response is sent to Delivery Partner 140 (step 808). If the delivery is located, the process proceeds to checking the delivery window (step 810) by comparing the Delivery Window parameter against the current time. An error message is sent (step 812) in the event that the request is made outside of the delivery window.

If the delivery window is still open, a status request is made by Smart Access Server 180 to Server 120 (step 814). Smart Access Server 180 finds the authentication details for the linked hardware set by the user. The request also includes the original request from Delivery Partner 140, including the digital signature and public certificate. This allows Server 120 to verify the request.

This verification by Server 120 (step 816) is dependent on the particular installed implementation. A suggested minimum standard is for Server 120 to check that the authentication credentials provided in the request are correct. Server 120 also should verify the original request in a similar manner to the verification performed by Smart Access Server 180. An error response is forwarded to Smart Access Server 180 in the event of an unsuccessful verification (step 818).

If the verification is successful, Server 120 actions the status request command by querying its database for the current status of the controlled device (step 820). Examples of current device statuses are open, closed, opening, closing etc. This status information is communicated to Smart Access Server 180. Responses received from Server 120 are validated (step 822) and if unsuccessful, an error message is sent to Delivery Partner 140 (step 824). A success response is then forwarded to Delivery Partner 140 (step 826).

Figure 9:
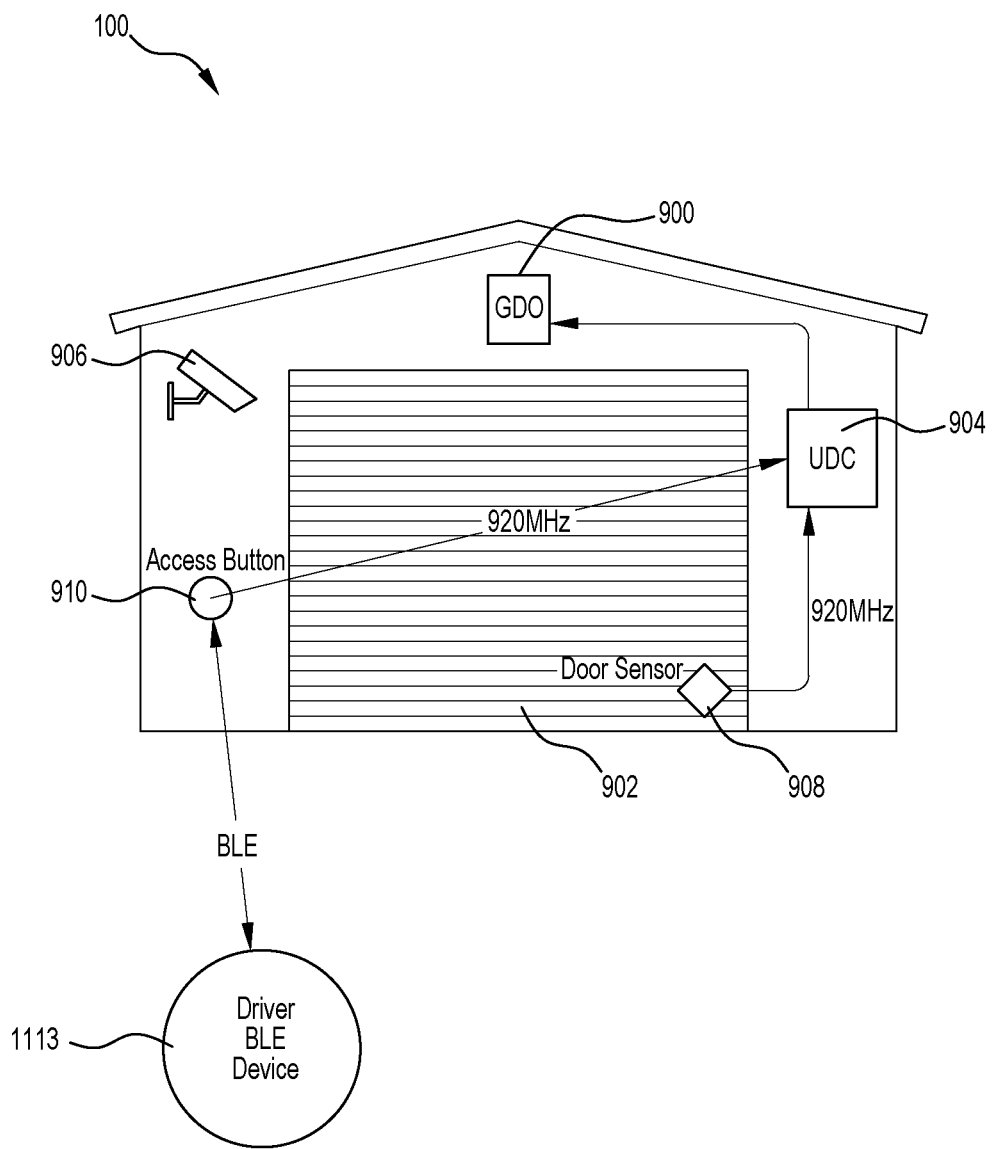
FIG. 9 is a schematic illustration of a second embodiment of a compatible hardware system.

Another example of compatible hardware 100 is illustrated in FIG. 9. Hardware 100 includes a garage door opener 900 for opening and closing a garage door 902. Door opener 900 is also in radio communication with a universal door controller (UDC) that includes a network-connected hub 904. As described above, and in the Applicant's published PCT application no. WO 2016/058044, hub 904 allows for both local and remote (i.e over the Internet) control and monitoring of the garage door opener 900, and in turn the garage door 902. A camera 906 is installed in the interior of the garage area to which the garage door 902 provides access. This allows video footage of the garage area to be captured and events such as opening and closings of the garage door 902 and the delivery of parcels to be recorded.

Hub 904 is also in radio communication (typically on a 920 MHz channel) with a door sensor 908 placed in the interior garage area, and an access button 910 located outside the garage area (i.e accessible from outside the garage door 902). Access button 910 includes a pair of radio transceivers, one for communicating with hub 904 (typically on a 920 MHz channel) and another for communicating with mobile devices situated outside of the garage area proximate to access button 910. This second transceiver implements a short-distance wireless data exchange technology such as Bluetooth, Zigbee or RFID.

As described below, software executing on hub 904 combines with access button 910 and a wireless device carried by an access partner (such as a parcel deliverer) to facilitate secure and temporary access to the garage area. This temporary access methodology and compatible hardware can also be readily integrated into the online shopping environment, in which physical goods are purchased online and then delivered to the purchaser's residence or other desired address. The temporary access methodology and compatible hardware can be leveraged to allow physical goods to be delivered to a purchaser's desired address even when there is no-one present at the address to accept the delivery.

Figure 10:
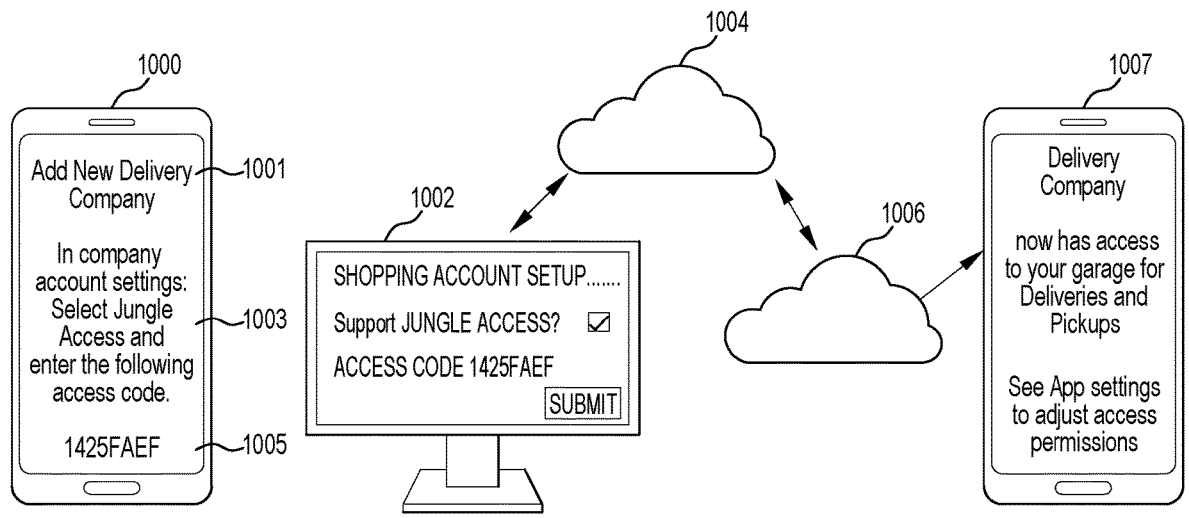
FIG. 10 is a schematic illustration showing the process of enrolling an access partner in the temporary access system according to the invention.

Turning to FIG. 10, the first step in the process is to activate temporary access for User 110's garage area in the user's account with the online merchant. This is achieved by enrolling the merchant in an account that is already established for the network-connected hub 904. The account is accessible through a suitable smartphone app 1000 and maintained on an Access server 1006. User 110 navigates in the app settings and is presented with an option 1001 to 'Add New Delivery Company'. This embodiment of the invention is particularly suited to providing temporary access to online merchants that are also responsible for delivering purchased goods to the customer. Such merchants can thus be considered as 'delivery companies'.

Upon selecting option 1001, User 101 is presented with instructions 1003 about how to complete the delivery company addition, and an access code 1005. User 101 follows the instructions 1003 to sign into their account 1002 with the online merchant. Once signed into the account, User 101 navigates to the account settings and selects the relevant option (in FIG. 10 designated as 'Jungle Access'). The online merchant prompts for the entry of an access code, which is the same code 1005 forwarded earlier within smartphone app 1000.

Upon entry of access code 1005, the code is forwarded to the merchant's Internet servers 1004. The access code 1005 is then transmitted from the merchant's Internet server 1004 to Access server 1006 where it is used to request access to the User 101's hub. Access server 1006 uses the access code as a search key to obtain an identifier for hub 904, such as a serial number or an account number for the hub. If an identifier is located by Access server 1006 it is returned to the merchant's server 1004 to be included in the user's account record. The User's account record in Access server 1006 is also updated to reflect the addition of the new delivery company. The User 101 is then notified 1007 through smartphone app 1000 of the fact that the delivery company has been provided with access to the User's garage for deliveries and pickups.

User 101 can selectively revoke the access provided to particular delivery companies or make suitable adjustments to individual access permissions and parameters (for example to specify that access is only provided during particular time intervals) through smartphone app 1000.

Figure 11:
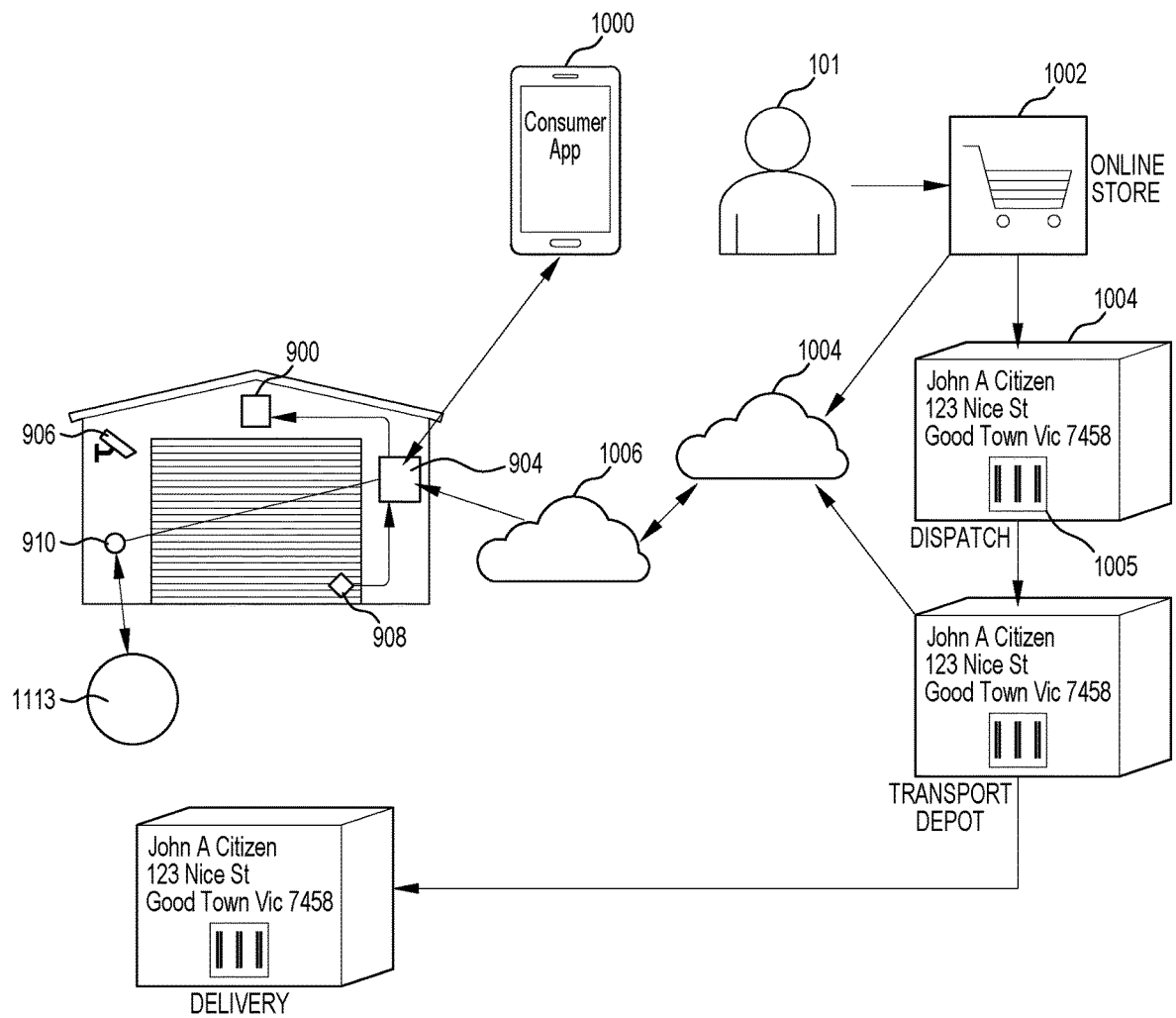
FIG. 11 is a schematic illustration of an example of a parcel delivery made using the temporary access system according to the invention.

An example of the utilisation of the temporary access permission provided to an access partner is illustrated in FIG. 11. Firstly, User 110 visits the merchant's online store 1002 for which garage access has previously been enabled (process described above) and purchases goods in the usual manner. The purchase transaction is processed on the merchant's servers 1004 where it is noted from User 110's updated account records that deliveries are to be made into the user's garage and that access to that garage has been granted by the user.

The parcel containing the user's purchased goods is processed and dispatched (step 1104). This involves generating a consignment number 1105 for the parcel which is stored on merchant's server 1004 in the customer's account record in association with the hub identifier.

The parcel is then forwarded to the 'last mile' transport depot 1106 (namely the delivery depot from where the parcel will be delivered to User 101's delivery address.

Delivery drivers each carry a wireless (typically Bluetooth or RFID) access device in the form of a keyfob. When Bluetooth is used, the keyfob (or similar) device is preferably a Bluetooth Low Energy (BLE) device (also known as Bluetooth Smart), which is a wireless personal area network technology with very low power consumption and cost but with a similar communication range to standard Bluetooth. Although a keyfob is used in this example, other devices including smartwatches or mobile phones could be used. According to the present embodiment, keyfobs are optionally provided to the access partner by the distributor of hub 904 for use in the temporary access system. A private key is securely stored on the keyfob.

The parcel consignment number is scanned at transport depot 1106. The scanned consignment number is transmitted to the merchant's server 1004 along with a unique identifier for the keyfob. The 'universal unique identifier' (UUID) used to identify Bluetooth services within the Service Discovery Protocol can, for example, be utilised as the keyfob's unique identifier.

Upon receipt of this information at the merchant's servers 1004, the consignment number is cross-referenced with the previously stored delivery record, and the record is updated with the provided keyfob identifier.

The merchant's server 1004 then communicates with Access server 1006 using the previously stored hub identifier and provides the keyfob identifier. The keyfob identifier is stored on Access server 1006 in association with the hub identifier. In addition, the keyfob identifier, public key corresponding to the keyfob's private key, as well as other relevant information describing the delivery, are transmitted to the hub 904 that is identified by the hub identifier, for local storage thereon.

The parcel is delivered (step 1108) to the user's premises 1110. The delivery driver again scans the parcel into its tracking system and is instructed thereby to press the access button 910 located adjacent to the garage door. When button 910 is pressed, transceivers (internal thereof or connected thereto) are energised from a sleep state to a wake state, and a signal sent to the hub 904 informing of the activation. The system can further be configured such that camera 906 can be activated by hub 904 in response to such activation. Hub 904 also instructs the Bluetooth transceiver of button 910 to commence scanning for Bluetooth devices, allowing it to receive signals broadcast from keyfob 1113. Upon receipt of a broadcast signal, button 910 attempts to connect to keyfob 1113.

For security purposes (namely to ensure that only authorised access devices are provided with access), button 910 and hub 904 conduct a routine to authenticate keyfob 1113. This involves button 910 sending a random number to keyfob 1113 that the keyfob encrypts using its stored private key. Keyfob 1113 provides the encrypted number, along with its keyfob identifier to button 910, which in turn transmits the information to hub 904. Hub 904 compares the provided keyfob identifier with the stored value previously provided from the merchant's server 1006. In addition, hub 904 attempts to decrypt the encrypted number using the previously-provided public key.

A successful decryption is indicative of the fact that the keyfob possesses an authorised private key corresponding to the public key provided from Access server 1006. In combination with the matching of the keyfob identifier, a robust security solution is provided. Further, it will be understood that the hybrid system requiring the activation of a physical device (push button 910) precludes any possibility of gaining temporary access to garage door opener through software operation alone, addressing the potential impact of hacking.

In the event that the authentication routine is successful, hub 904 issues a command (over the radio channel) to garage door opener 900 to open the garage door 902. The driver places the parcel in the garage and again presses access button 910. This causes a signal to be sent to hub 904 to issue a command to garage door opener 900 to close garage door 902. This also acts to revoke the access permission provided for that delivery, and switches the transceivers of access button 910 back into sleep mode.

The system is designed such that positive action (such as pressing a button to initiate an opening and closing of the garage door) by a user is required. However, ameliorative routines are built into the system to account for scenarios in which an expected positive action is not received. For example, in the event that a delivery driver fails to close the garage door after making the delivery, hub 904 is programmed to close the door if it remains open while a temporary access transaction is in place. The user is also notified of such events through the smartphone app 1000.

Optionally, before issuing the command to the garage door opener, hub 904 sends a message to the user's smartphone app 1000 (by way of Access server 1006) informing the user that a delivery is about to be made and seeking the user's consent to opening the garage door. The user's response is received at smartphone app 1000, transmitted to Access server 1006 and forwarded to hub 904 for actioning.

FIGS. 12, 13 and 14 are examples of suitable user interfaces for the smartphone app 1000. FIG. 12A illustrates the feature discussed above of blocking deliveries from a selected access partner. FIG. 12B illustrates a screen with a graphical representation of the garage door and a selectable option to switch to camera view. Camera view is illustrated in FIG. 12C, which shows a live stream of the interior of the garage captured by the camera.

FIG. 13A illustrates an example of a homescreen for the smartphone app 1000 (also shown in FIG. 12A). Additional detail about the deliveries listed in the user interface shown in FIG. 13A is provided in FIGS. 13B-13F. In this regard, FIG. 13B shows a pending delivery list, FIG. 13C shows details of scheduled deliveries, FIG. 13D shows details of in-progress deliveries, FIG. 13E shows a list of completed deliveries and FIG. 13E shows details of those completed deliveries.

FIG. 14A illustrates a user settings screen showing settings for 'Partners' and 'Access Control'. The Partners setting is illustrated in FIG. 14B showing a list of trusted partners to whom temporary access has been (or is in the process of being) provided. The first partner on the list in FIG. 14B has been enrolled in the temporary access system, with the second partner's enrolment still being at the pending stage. Details of the deliveries from the enrolled partner are illustrated in FIG. 14C. FIG. 14E shows the option for adding new partners, with FIG. 14F illustrating the provision of an access code to enroll the partner, as described above.

The Access control settings are illustrated in FIG. 14D. These allow various access control parameters (such as times during which deliveries can be made) to be specified.

The above description is provided by way of illustration only, and it will be understood that the broad scope and ambit of the invention embrace all modifications and variations thereto as would be apparent to persons skilled in the art.

It is to be understood that, throughout the description and claims of the specification, the word 'comprise' and variations of the word, such as 'comprising' and 'comprises', is not intended to exclude other additives, components, integers or steps.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for enabling provision of temporary access to an area controlled by a network-connected endpoint device and a transceiver located in physical proximity thereto, the method including the steps of:

enrolling an access partner in an account for the endpoint device, the account maintained at an access server;

receiving, from the access partner at the access server, a request for temporary access to the endpoint device, the request including a unique identifier of a wireless access device associated with the access partner, the wireless access device having a private key stored thereon; and transmitting the unique identifier from the access server to the endpoint device to activate the request with the endpoint device such that the access partner may be provided with temporary access to the area, wherein the wireless access device is authenticated by the endpoint device by:

the transceiver sending authentication data to the wireless access device over a wireless communication channel, the wireless access device encrypting the authentication data with the private key, the wireless access device communicating an identifier and the encrypted authentication data to the transceiver over the wireless communication channel, the endpoint device comparing the identifier with the unique identifier stored on the endpoint device, and the endpoint device attempting to decrypt the encrypted authentication data with a public key corresponding to the private key.

2. A method according to claim 1, wherein the transceiver is configured to be activated by a manually-operable actuator.

3. A method according to claim 1, wherein the unique identifier is removed from the endpoint device after a temporary access permission parameter is no longer applicable.

4. A method according to claim 3, wherein the temporary access permission parameter is a predetermined time or time period.

5. A method according to claim 1, wherein the step of enrolling an access partner comprises providing the access partner with an identifier for the endpoint device.

6. A method according to claim 5, wherein the access partner records the endpoint device identifier in its user account records for a user associated with the endpoint device.

7. A method according to claim 1, wherein the endpoint device is operable to send control signals to a garage door opener or to an electronic lock.

8. A system for enabling provision of temporary access to an area, comprising:

a network-connected endpoint device having a processor and data storage, the endpoint device being adapted to send control signals to an access controller controlling access to the area;

a transceiver communicatively coupled to the endpoint device, the transceiver capable of wirelessly detecting access devices in physical proximity thereto, the access devices having private keys stored thereon; and computer software stored on the endpoint device that, when executed by the processor, causes the endpoint device to:

receive from an access server over the network an activated request for temporary access to the area, the request including a unique identifier for an access device seeking access and being activated by the access server transmitting the unique identifier to the endpoint device, receive communications from the transceiver upon detection of a physically proximate access device, send authentication data through the transceiver to the detected access device over a wireless communication channel, the detected access device encrypting the authentication data with the private key stored on the access device, receive an identifier and the encrypted authentication data from the detected access device through the transceiver over the wireless communication channel, compare the identifier with the unique identifier received from the access server, attempt to decrypt the encrypted authentication data with a public key corresponding to the private key of the detected access device, and upon determining that the identifier received from the detected access device matches the unique identifier and successful decryption of the encrypted authentication data received from the detected access device using the public key, send a requisite control signal to the access controller to provide the sought temporary access to the area.

9. A system according to claim 8, wherein the request further includes the public key corresponding to the private key stored on the access device seeking access.

10. A system according to claim 9, wherein the computer software removes the unique identifier from the endpoint device after a temporary access permission parameter is no longer applicable.

11. A system according to claim 9, wherein the access controller is a garage door opener or an electronic lock.

12. A system according to claim 11, wherein the electronic lock controls access to a lockable parcel box.

13. An apparatus for enabling provision of temporary access to an area, the apparatus comprising a network-connected endpoint device that is adapted to communicate with an access controller controlling access to the area, the endpoint device having a processor, data storage, and computer software stored thereon that, when executed by the processor, causes the endpoint device to:

receive from an access server a request for temporary access to the area via the access controller, said request being issued by or on behalf of an access partner enrolled in an account for the endpoint device maintained at the access server, the request also including a unique identifier of a wireless access device associated with the access partner and being activated by the access server, said activation being signified by receipt of the unique identifier by the endpoint device from the access server;

receive communications from a transceiver connected to the endpoint device upon the transceiver detecting an access device in physical proximity thereto;

send authentication data through the transceiver to the detected access device over a wireless communication channel, the detected access device encrypting the authentication data with a private key stored on the access device;

receive an identifier and the encrypted authentication data from the detected access device through the transceiver over the wireless communication channel;

compare the identifier with the unique identifier received from the access server;

attempt to decrypt the encrypted authentication data with a public key corresponding to the private key of the detected access device; and upon determining that the identifier received from the detected access device matches the unique identifier and successful decryption of the encrypted authentication data received from the detected access device using the public key, send a requisite control signal to the access controller to provide the sought temporary access to the area.

* * * * *